(12) United States Patent
Futaki

(10) Patent No.: US 11,076,345 B2
(45) Date of Patent: Jul. 27, 2021

(54) RADIO TERMINAL, RADIO STATION, AND METHOD THEREFOR

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 15/564,655

(22) PCT Filed: Jan. 13, 2016

(86) PCT No.: PCT/JP2016/000127
§ 371 (c)(1),
(2) Date: Oct. 5, 2017

(87) PCT Pub. No.: WO2016/163059
PCT Pub. Date: Oct. 13, 2016

(65) Prior Publication Data
US 2018/0098266 A1    Apr. 5, 2018

(30) Foreign Application Priority Data

Apr. 8, 2015   (JP) .............................. JP2015-079068

(51) Int. Cl.
*H04L 5/00*        (2006.01)
*H04W 48/12*      (2009.01)
(Continued)

(52) U.S. Cl.
CPC ............. *H04W 48/12* (2013.01); *H04L 5/001* (2013.01); *H04L 5/0053* (2013.01);
(Continued)

(58) Field of Classification Search
CPC .... H04L 5/0098; H04L 5/0032; H04W 24/02; H04W 4/18; H04W 48/16;
(Continued)

(56) References Cited

U.S. PATENT DOCUMENTS

| 2014/0003392 A1* | 1/2014 | Yang | ..................... H04L 5/0094 370/331 |
| 2014/0016593 A1* | 1/2014 | Park | ..................... H04W 74/004 370/329 |

(Continued)

FOREIGN PATENT DOCUMENTS

| EP | 2 849 359 A1 | 3/2015 |
| EP | 3 089 533 A1 | 11/2016 |

OTHER PUBLICATIONS

3GPP TSG RAW WG2 Meeting #89, R2-150150 Feb. 9-13, 2015.*
(Continued)

*Primary Examiner* — Abdelillah Elmejjarmi

(57) ABSTRACT

A radio terminal (1) is configured in such a way that, when the radio terminal (1) receives a downlink signalling message including an information element (641) indicating that a first UL control channel (622) is to be configured in a first secondary cell (SCell) (602) that has already been added as an SCell in a carrier aggregation, where the first UL control channel (622) is to be used to transmit uplink (UL) control information for at least one SCell (602, 603) including the first SCell (602), the radio terminal (1) deactivates one or more SCells (602, 603) in an activated state among the at least one SCell (602, 603).

18 Claims, 21 Drawing Sheets

(51) Int. Cl.
*H04W 72/04* (2009.01)
*H04W 76/15* (2018.01)
*H04W 76/27* (2018.01)
*H04W 88/06* (2009.01)

(52) U.S. Cl.
CPC ....... *H04W 72/04* (2013.01); *H04W 72/0413* (2013.01); *H04W 72/0453* (2013.01); *H04W 76/15* (2018.02); *H04W 76/27* (2018.02); *H04W 88/06* (2013.01); *H04W 72/042* (2013.01)

(58) Field of Classification Search
CPC ......... H04W 52/0216; H04W 52/0241; H04W 56/0005; H04W 56/0045; H04W 72/042; H04W 72/0426; H04W 72/0453
See application file for complete search history.

(56) References Cited

U.S. PATENT DOCUMENTS

| | | | |
|---|---|---|---|
| 2015/0092713 A1* | 4/2015 | Pelletier | H04W 52/365 370/329 |
| 2017/0170941 A1* | 6/2017 | Yang | H04W 76/18 |
| 2018/0343101 A1* | 11/2018 | Dinan | H04L 5/0057 |

OTHER PUBLICATIONS

International Search Report dated Mar. 15, 2016, in corresponding PCT International Application.
3rd Generation Partnership Project; Technical Specification Group Radio Access Network, Evolved Universal Terrestrial Radio Access, (E-UTRA), Requirements for Support of Radio Resource Management, (Release 12), 3GPP TS 36.321, V12.5.0, pp. 1-77, (2015).
3rd Generation Partnership Project; Technical Specification Group Radio Access Network, Evolved Universal Terrestrial Radio Access, (E-UTRA), Medium Access Control (MAC) Protocol Specification, (Release 12), 3GPP TS 36.133, V12.6.0, pp. 1-32, (2014).
3GPP TSG-RAN WG2 Meeting #89, R2-150372, "Introduce PUCCH on SCell for CA Beyound 5 Carriers", pp. 1-8, (2015).
3GPP TSG-RAN WG2 Meeting #89, R2-150169, "Consideration for PUCCH on SCell in Carrier Aggregation", pp. 1-4, (2015).
3GPP TSG-RAN WG2 Meeting #89, R2-150264, "Discussion on the Functionality of PUCCH SCell", pp. 1-4, (2015).
3GPP TSG-RAN2 Meeting #89bis, R2-151419, "SCell State at PUCCH SCell Configuration", pp. 1-4, (2015).
Extended European Search Report dated Oct. 9, 2018, issued by the European Patent Office in counterpart European Patent Application No. EP 16 77 6239.
Notice of Reasons for Refusal dated Jul. 30, 2019, by the Japanese Patent Office in counterpart Japanese Patent Application No. JP 2017-511453.
Alcatel-Lucent, Alcatel-Lucent Shanghai Bell; "Considerations on PUCCH on SCell", 3GPP TSG-RAN WG2 Meeting #89, R2-150406, pp. 1-4 (2015).
ZTE; "Activation/Deactivation for SCell Carrying PUCCH", 3GPP TSG RAN WG2 Meeting #89, R2-150150, pp. 1-4 (2015).
Nokia Corporation (Rapporteur); "Running 36.300 CR to Capture Agreements on Carrier Aggregation Enhancements", 3GPP TSG-RAN WG2 Meeting #89, R2-150728, pp. 1-4 (2015).
RAN2; "LS on RAN2 Agreements on CA Enhancements", 3GPP TSG-RAN WG2 Meeting #89, R2-150729, pp. 1-5 (2015).
RAN2; "LS on RAN2 Agreements on CA Enhancements", 3GPP TSG-RAN WG1 Meeting #80bis, R2-151251, pp. 1-5 (2015).

\* cited by examiner

```
SCellToAddModList-r10 ::= SEQUENCE (SIZE (1..maxSCell-r10)) OF SCellToAddMod-r10
SCellToAddMod-r10 ::=    SEQUENCE {
    sCellIndex-r10           SCellIndex-r10,           -- 1602                  1601
    ...,
    [[ -- PUCCH Cell Group configuration
    -- Alt 1 where index of PUCCH Cell Group containing PCell is 0 by default
    pucch-CellGroupIndex-r13    INTEGER (1..31)   OPTIONAL, -- Need ON
    -- Alt 2 where index of PUCCH Cell Group containing PCell is indicated with set to 0
    pucch-CellGroupIndex-r13    INTEGER (0..31)   OPTIONAL, -- Need ON
    ]]
```

Fig. 16

```
RRCConnectionReconfiguration-v13xy-IEs ::= SEQUENCE {                                    ┌─ 1701
    pucch-CellGroup-r13         CHOICE {
        release                     NULL,
        setup                       SEQUENCE {                                           ┌─ 1702
            -- Alt 1 where index of PUCCH Cell Group containing PCell is 0 by default
            pucch-CellGroupIndex-r13        INTEGER (1..31),
            -- Alt 2 where index of PUCCH Cell Group containing PCell is indicated with set to 0
            pucch-CellGroupIndex-r13        INTEGER (0..31),
                                                                    ┌─ 1703
            cellGroupList-r13           CellGroupList-r13,
        }
    }                                                                OPTIONAL, -- Need ON
    nonCriticalExtension        SEQUENCE {}                          OPTIONAL
}
CellGroupList-r13 ::= SEQUENCE (SIZE (1..maxPUCCHCellGroup-r13)) OF CellGroupList-r13    ┌─ 1704
PUCCHCellGroup-r13 ::= SEQUENCE {
    -- Alt 1
    sCellIndex-r10          SCellIndex-r10,
    -- Alt 2
    servCellIndex-r10       ServCellIndex-r10,
}
```

Fig. 17

RADIO TERMINAL, RADIO STATION, AND METHOD THEREFOR

CROSS-REFERENCE TO RELATED PATENT APPLICATIONS

This application is a National Stage Entry of International Application No. PCT/JP2016/000127, filed Jan. 13, 2016, which claims priority from Japanese Patent Application No. 2105-079068, filed Apr. 8, 2015. The entire contents of the above-referenced applications are expressly incorporated herein by reference.

TECHNICAL FIELD

The present disclosure relates to radio communication and, in particular, to a radio communication system in which a radio terminal transmits or receives data using a plurality of carriers simultaneously.

BACKGROUND ART

Standardization of extension functions for Long Term Evolution (LTE)-Advanced to achieve higher-capacity and higher-speed communication is discussed in the 3rd Generation Partnership Project (3GPP). One of these extension functions is increasing the maximum number of carriers supported by Carrier Aggregation (CA), which is now five carriers (Component Carriers (CCs)), up to 32 carriers (CCs). This promises to provide higher-speed communication.

However, as the number of carriers (the number of CCs) increases, an amount of Uplink Control Information (UCI) transmitted on an uplink increases as well. The increase in the amount of UCI is expected to cause problems such as an amount of information that one radio terminal (User Equipment (UE)) should transmit on a Physical Uplink Control Channel (PUCCH) becoming significantly large or PUCCH resources becoming insufficient. UCI includes control information regarding a downlink and includes, for example, Channel State Information (CSI). CSI includes at least one of a Channel Quality Indicator (CQI), a Pre-Coding Matrix Indicator (PMI), and a Rank Indicator (RI).

Further, when UEs perform CA on the same cells, in particular CA on a low-frequency (e.g., 800 MHz) first cell and a high-frequency (e.g., 3.5 GHz) second cell, it is expected that many UEs use the low-frequency first cell as a primary cell (PCell) and use the high-frequency second cell as a secondary cell (SCell). In this case, since the UEs transmit the UCI for the second cell (SCell) on a PUCCH of the first cell (PCell), it is expected that a problem that overhead of the first cell will significantly increase will be caused.

In view of such problems, a function of allowing transmission of a PUCCH on a CC used as an SCell (i.e., Secondary CC (SCC)) has been discussed. This function is referred to as a "PUCCH on SCell" or "SCell PUCCH". This function enables mitigation of shortage of PUCCH resources or mitigation of concentration of PUCCH overhead in a specific cell.

It has been proposed that, when a PUCCH is configured in one of the plurality of SCells, the base station (eNodeB (eNB)) configures in the UE, on a per-SCell basis, which one of the PUCCH on the PCell and the PUCCH on the SCell is to be used to transmit the UCI. It is expected that the UCI for the PCell is always transmitted on the PUCCH on the PCell. The group of cells whose UCI is transmitted on the PUCCH of the same cell (PCell or SCell) may be referred to as a "PUCCH Cell Group (PCG)". In the following description, a PCG including the PCell is referred to as a "Primary PCG (P-PCG)" and a PCG composed only of one or more SCells including the SCell that transmits a PUCCH is referred to as a "Secondary PCG (S-PCG)".

In CA, the SCell activation/deactivation mechanism is supported to reduce battery consumption of the UE when CA is configured. Addition of SCells and activation thereof will be described below.

When the UE has received a Radio Resource Control (RRC) Connection Reconfiguration message and one or more SCells has been added (newly configured) by this RRC Connection Reconfiguration message (SCell addition), the one or more added SCells are initially in the deactivated state. That is, the RRC layer of the UE configures a lower layer(s) (i.e., Medium Access Control (MAC) layer) to consider the one or more added SCells to be in the deactivated state. On the other hand, when the RRC Connection Reconfiguration message indicates modification of the configuration of an SCell that has already been configured (i.e., SCell modification), the UE does not change the state regarding the activation of this SCell and keeps the state before receiving the RRC Connection Reconfiguration message.

Accordingly, in order to move the added SCell(s) into the activated state, an additional activation procedure is required. The network (i.e., eNB) is able to transmit an Activation/Deactivation MAC control element (CE) to the UE to activate an SCell(s) that has been configured in the UE and is in the deactivated state (see Non-Patent Literature 1). Upon receiving an Activation/Deactivation MAC CE for activating an SCell(s) s the UE activates the SCell(s) specified by the MAC CE.

When the SCell is activated, the UE performs the following operations:
transmitting Sounding Reference Signals (SRS) on the SCell when the uplink CA is configured;
monitoring a downlink control channel (Physical Downlink Control Channel (PDCCH) on the SCell;
monitoring a PDCCH for the SCell in the case of the cross-carrier scheduling; and
performing CSI reporting for the SCell.
On the other hand, when the SCell is deactivated, the UE does not perform the following operations:
transmitting SRS on the SCell;
transmitting an Uplink Shared Channel (UL-SCH) on the SCell;
transmitting a Random Access Channel (RACH) on the SCell;
monitoring a PDCCH on the SCell;
monitoring a PDCCH for the SCell; or
performing CSI reporting for the SCell.
That is, the UE performs CSI reporting for SCells in the activated state, but it does not perform CSI reporting for SCells in the deactivated state. However, the delay until the CSI of the activated SCell becomes available (e.g., delay until a valid CQI regarding the activated SCell is acquired in the UE) depends on the processing power of each UE and is not uniquely determined in the system. Accordingly, it is defined that, upon receiving an Activation/Deactivation MAC CE for activating the SCell in subframe #n, the UE shall be capable to transmit valid CSI report no later than in subframe #n+24 or #n+34 (see Non-Patent Literature 2).

In the following description, a case in which a new Secondary PCG (S-PCG) is added to the UE in which the Primary PCG (P-PCG) and zero or more Secondary PCGs (S-PCGs) have already been configured will be discussed. We first discuss a case in which all the SCells in the new S-PCG are newly added to the UE (i.e., SCell addition). As described above, the UE considers all the SCells to be in the deactivated state. That is, all the SCells that have been newly added are initially in the deactivated state. Upon receiving an Activation/Deactivation MAC CE for activating these SCells from the eNB in subframe #n, the UE activates the SCells and starts to transmit valid CSI report no later than subframe #n+24 or #n+34. This operation is similar to the existing operation of the SCell addition and SCell activation in CA, and thus does not cause any significant problem.

Next, we discuss a case in which the S-PCG has already been added, the S-PCG includes an SCell in the activated state, and a PUCCH is newly transmitted in this SCell. In this case, for example, it might be possible to use the SCell modification procedure and to keep this SCell continuously in the activated state. In this procedure, however, the eNB cannot recognize whether valid CSI report to be transmitted on the PUCCH of this SCell has been successfully prepared in the UE. Even when the UE has successfully prepared the valid CSI report, it is expected that some delay is required before the UE becomes ready to transmit this report on the newly configured PUCCH.

In view of the aforementioned problem, Non-Patent Literature 3 proposes that, when some SCells to be included in the S-PCG to be added are currently included in the P-PCG and these SCells are in the activated state, these SCells should be deactivated first and all the SCells including the PUCCH SCell in the S-PCG to be added should remain in the deactivated state during the RRC Connection Reconfiguration procedure for the S-PCG addition. The term "PUCCH SCell" means an SCell on which a PUSCCH is transmitted. Non-Patent Literature 3 proposes two options for deactivating SCells in the activated state. In Option 1, each of the activated SCells is deactivated by an Activation/Deactivation MAC CE before it is added to the S-PCG. In Option 2, each of the activated SCells is released first and then it is added again.

CITATION LIST

Patent Literature

Non-Patent Literature

[Non-Patent Literature 1] 3GPP TS 36.321 V12.5.0 (2015-03), "3rd Generation Partnership Project; Technical Specification Group Radio Access Network; Evolved Universal Terrestrial Radio Access (E-UTRA); Medium Access Control (MAC) protocol specification (Release 12)", March, 2015
[Non-Patent Literature 2] 3GPP TS 36.133 V12.6.0 (2014-12), "3rd Generation Partnership Project; Technical Specification Group Radio Access Network; Evolved Universal Terrestrial Radio Access (E-UTRA); Requirements for support of radio resource management (Release 12)", December, 2014
[Non-Patent Literature 3] 3GPP R2-150372. Huawei, HiSilicon, "Introduce PUCCH on SCell for CA beyond 5 carriers", February, 2015

SUMMARY OF INVENTION

Technical Problem

The aforementioned Options 1 and 2 disclosed in Non-Patent Literature 3 may cause the following problems. First, the Option 2 disclosed in Non-Patent Literature 3 forces the UE to perform redundant processing to release the activated SCells first and then add them again. Therefore, the option 2 may cause an additional delay due to the processing of the SCell release and re-addition. There is another problem that the information element indicating the SCell configuration needs to be retransmitted from the eNB to the UE in order to add the SCells again.

On the other hand, the Option 1 disclosed in Non-Patent Literature 3 does not require the processing of the SCell release and re-addition. However, the Option 1 requires transmission of an explicit Activation/Deactivation MAC CE to deactivate the activated SCells. Therefore, the option 1 may cause an additional delay due to the transmission of the redundant Activation/Deactivation MAC CE.

One of the objects to be attained by the embodiments disclosed herein is to provide an apparatus, a method, and a program that contribute to avoiding release and re-addition of one or more SCells and to reducing the number of control signallings in order to configure, in a first SCell that has already been added or is to be newly added and that is included in the one or more SCells, an uplink control channel (e.g., PUCCH) to be used for transmission of uplink control information (e.g., CSI) for the one or more SCells. Note that this object is only one of the objects to be attained by the embodiments disclosed herein. The other objects or problems and novel features will be made apparent from the following description and the accompanying drawings.

Solution to Problem

In a first aspect, a radio terminal includes: a wireless transceiver configured to communicate with a radio station; and at least one processor configured to perform carrier aggregation with the radio station using the wireless transceiver. The at least one processor is configured in such a way that, when the at least one processor receives a downlink signalling message including an information element indicating that a first uplink control channel is to be configured in a first secondary cell (SCell) in the carrier aggregation, where the first uplink control channel is to be used to transmit uplink control information (UCI) for at least one SCell including the first SCell, the at least one processor deactivates one or more activated SCells in an activated state among the at least one SCell.

In a second aspect, a method performed in a radio terminal configured to communicate with a radio station includes:
(a) receiving from the radio station one or more first downlink signalling messages including secondary cell (SCell) configuration for carrier aggregation and adding one or more SCells in the carrier aggregation, the one or more SCells being initially in a deactivated state;
(b) receiving from the radio station one or more second downlink signalling messages including an activation instruction and activating part or all of the one or more SCells in accordance with the activation instruction; and
(c) upon receiving a third downlink signalling message including an information element indicating that a first uplink control channel is to be configured in a first SCell that has already been added in accordance with the SCell configuration or is to be newly added, where the first uplink control channel is to be used to transmit uplink control information (UCI) for at least one SCell including the first SCell, deactivating one or more activated SCells in an activated state among the at least one SCell.

In a fourth aspect, a radio station includes: a wireless transceiver configured to communicate with a radio terminal; and at least one processor configured to perform carrier aggregation with the radio terminal using the wireless transceiver. The at least one processor is configured in such a way that, when the at least one processor completes transmission of a downlink signalling message including an information element indicating that a first uplink control channel is to be configured in a first secondary cell (SCell) in the carrier aggregation, where the first uplink control channel is to be used to transmit uplink control information (UCI) for at least one SCell including the first SCell, the at least one processor considers one or more activated SCells in an activated state among the at least one SCell to be deactivated by the radio terminal.

In a fifth aspect, a method performed in a radio station configured to perform carrier aggregation with a radio terminal includes, upon completion of transmission to the radio terminal of a first downlink signalling message including an information element indicating that a first uplink control channel is to be configured in a first secondary cell (SCell) in the carrier aggregation, where the first uplink control channel is to be used to transmit uplink control information (UCI) for at least one SCell including the first SCell, considering one or more activated SCells in an activated state among the at least one SCell to be deactivated by the radio terminal.

In a sixth aspect, a program includes instructions (software codes) that, when loaded into a computer, cause the computer to perform the method according to the aforementioned second or fifth aspect.

Advantageous Effects of Invention

According to the aforementioned aspects, it is possible to provide an apparatus, a method, and a program that contribute to avoiding release and re-addition of one or more SCells and to reducing the number of control signallings in order to configure, in a first SCell that has already been added or is to be newly added and that is included in the one or more SCells, an uplink control channel (e.g., PUCCH) to be used for transmission of uplink control information (e.g., CSI) for the one or more SCells.

BRIEF DESCRIPTION OF DRAWINGS

FIG. 16 is a diagram showing one example of an information element for adding, changing, or reconfiguring a PUCCH Cell Group (PCG);

FIG. 17 is a diagram showing one example of the information element for adding, changing, or reconfiguring a PUCCH Cell Group (PCG);

DESCRIPTION OF EMBODIMENTS

Hereinafter, specific embodiments will be described in detail with reference to the drawings. The same or corresponding elements are denoted by the same reference signs throughout the drawings, and repeated descriptions will be omitted as necessary for the sake of clarity.

Embodiments described below will be described mainly using specific examples with regard to an Evolved Packet System (EPS) that contains LTE and System Architecture Evolution (SAE). However, these embodiments are not limited to being applied to the EPS and may also be applied to other mobile communication networks or systems such as a 3GPP UMTS, a 3GPP2 CDMA2000 system (1×RTT, HRPD (High Rate Packet Data)), a global system for mobile communications (GSM (registered trademark))/General packet radio service (GPRS) system, and a WiMAX system.

First Embodiment

Figure 1:
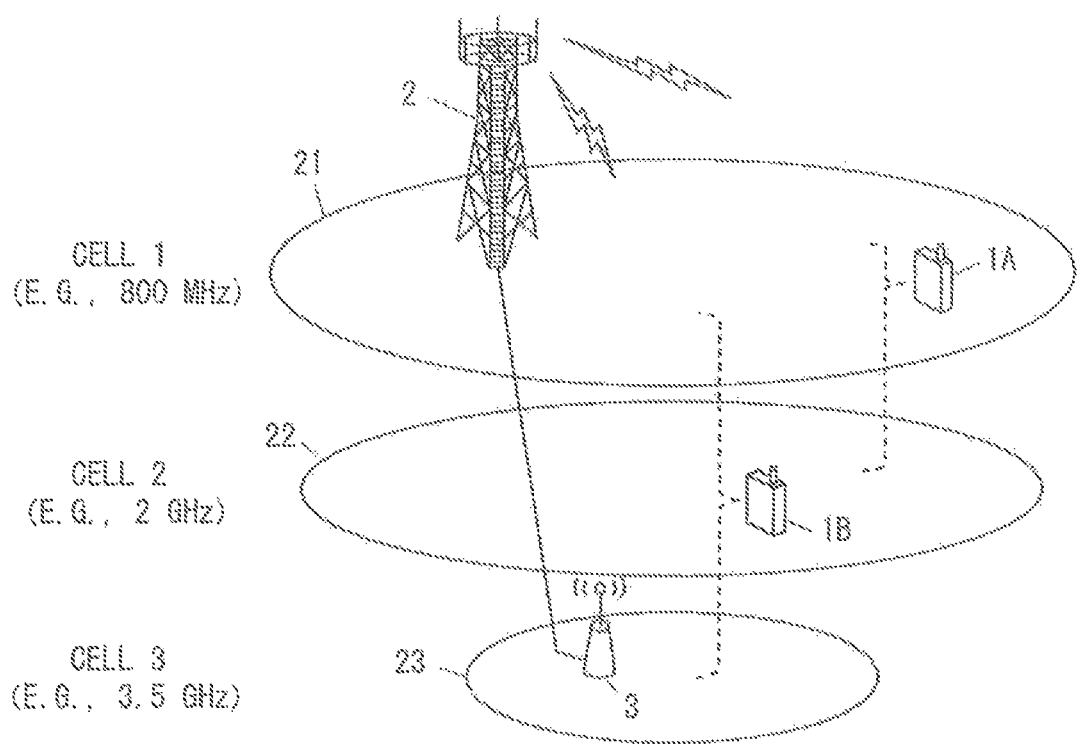
FIG. 1 is a diagram showing a configuration example of a radio communication system according to several embodiments.

FIG. 1 shows a configuration example of a radio communication system according to several embodiments including this embodiment. In the example shown in FIG. 1, the radio communication system includes at least one radio terminal (UE) 1 and a radio base station (eNB) 2. The eNB 2 provides a plurality of cells using component carriers (CCs) having different frequencies, in the example shown in FIG. 1, the eNB 2 provides a cell 21 (Cell 1, e.g., 800 MHz), a cell 22 (Cell 2, e.g., 2 GHz), and a cell 23 (Cell 3, e.g., 3.5 GHz). As shown in FIG. 1, at least one of the cells provided by the eNB 2 may be provided by a remote radio unit 3 connected to the eNB 2. This radio unit 3 is referred to as a Remote Radio Head (RRH) or a Remote Radio Equipment (RRE).

Each UE 1 is configured to support carrier aggregation (CA) and to communicate with the eNB 2 using a plurality of CCs (or a plurality of cells). In the example shown in FIG. 1, the UE 1A performs CA using the cell 21 as the PCell and using the cell 22 as an SCell. The UE 1B performs CA using the cell 22 as the PCell and using the cells 21 and 23 as SCells.

Each UE 1 supports the PUCCH on SCell (or SCell PUCCH) described above. Specifically, each UE 1 is configured to transmit uplink control information (UCI) not only on a PUCCH on the PCell but also a PUCCH on the SCell while performing CA. As described above, the UCI includes control information regarding a downlink and includes, for example, Channel State Information (CSI). The CSI includes at least one of a Channel Quality indicator (CQI), a Pre-Coding Matrix Indicator (PMI), and a Rank Indicator (RI). Further, the UCI may include an HARQ response (i.e., ACK, NACK) regarding downlink data reception. Further, each UE 1 may transmit, on the PUCCH of the SCell, a scheduling request (SR) for radio resources for uplink data transmission. As described above, it is expected that the UCI for the PCell is always transmitted on the PUCCH on the PCell. Accordingly, in some implementations, the UE 1 may transmit the UCI for the Primary PCG (P-PCG), which includes the PCell and zero or more SCells, on the PUCCH of the PCell, and transmit the UCI for the Secondary PCG (S-PCG), which includes one or more SCells including an SCell that transmits a PUCCH (i.e., PUCCH SCell), on the PUCCH of the PUCCH SCell.

Hereinafter, a procedure for configuring a PUCCH in an SCell of the UE 1 will be described. The SCell on which the PUCCH is to be configured (i.e., PUCCH SCell) may be an SCell that has already been added to the UE 1 and belongs to the P-PCG or the S-PCG, or may be an SCell to be newly added to the UE 1. Configuring a PUCCH on an SCell that has been previously added (or is to be newly added) to the UE 1 may be performed in association with, for example, an addition of a new S-PCG (hereinafter referred to as an S-PCG addition). Additionally or alternatively, configuring a PUCCH in an SCell that has been previously added (or is to be newly added) to the UE 1 may be performed in association with a change of the PUCCH SCell within a previously added (or configured) S-PCG (hereinafter referred to as an S-PCG change).

The eNB 2 is configured to transmit to the UE 1 a downlink (DL) signalling message regarding a configuration of the S-PCG to perform the S-PCG addition or S-PCG change. This DL signalling message includes an information element indicating an S-PCG addition or S-PCG change involving configuring a PUCCH in the SCell of the UE 1. The UE 1 is configured to, upon (or in response to) receiving the DL signalling message, deactivate all the SCells in the S-PCG to be added or changed (or to consider all the SCells to be in the deactivated state). Specifically, the UE 1 deactivates one or more activated SCells, which have been in the activated state, in the S-PCG to be added or changed (or the UE 1 considers these one or more activated SCells to be in the deactivated state). On the other hand, the UE 1 keeps one or more deactivated SCells, which are already in the deactivated state, within the added or changed S-PCG in the deactivated state (or the UE 1 considers these one or more deactivated SCells to be continuously in the deactivated state).

In this embodiment, the S-PCG concept may not be used. That is, the e NB 2 transmits to the UE 1 a DL signalling message including an information element indicating that a PUCCH to be used for transmission of the UCI for at least one SCell, including a first SCell that has already been added or is to be newly added to the UE 1, is configured in the first SCell. Upon (or in response to) receiving the DL signalling message, the UE 1 deactivates all of the at least one SCell (or considers all of the at least one SCell to be in the deactivated state). Specifically, the UE 1 deactivates one or more activated SCells, which have been in the activated state, among the at least one SCell (or the UE 1 considers these one or more activated SCells to be in the deactivated state). On the other hand, the UE 1 keeps one or more deactivated SCells, which are already in the deactivated state, among the at least one SCell in the deactivated state tor the UE 1 considers these one or more deactivated SCells to be continuously in the deactivated state).

As described above, the addition, change, and release of the SCell in the existing CA are performed on the RRC layer and an RRC Connection Reconfiguration message is used in these procedures. Accordingly, the DL signalling message to be transmitted to the UE 1 from the eNB 2 for an S-PCG addition or S-PCG change including configuring a PUCCH in the SCell may be typically an REC Connection Reconfiguration message. In this case, in response to the reception of the DL signalling message, the RRC layer of the UE 1 may set a lower layers(s) to consider one or more activated SCells in the activated state within the added or changed S-PCG to be in the deactivated state. Alternatively, the RRC layer of the UE 1 may set a lower layer(s) to change (or move) these one or us ore activated SCells to the deactivated state. The lower layer(s) includes a MAC layer.

The eNB 2 may operates in a similar manner to the UE 1. That is, when the eNB 2 has transmitted to the UE 1 the DL signalling message including the information element indicating that a PUCCH used to transmit the UCI for at least one SCell including the first SCell is to be configured in this first SCell, the eNB 2 may consider that the one or more activated SCells, among the at least one SCell, will be deactivated by the UE 1. More specifically, the RRC layer of the eNB 2 may set a lower layer(s) to consider the one or more activated SCells to be deactivated by the UE 1, when the eNB 2 has completed transmission of the DL signalling message.

As understood from the above description, in this embodiment, the UE 1 is configured to, in response to the reception of the DL signalling message (e.g., RRC Connection Reconfiguration message) for an S-PCG addition or S-PCG change involving configuring a PUCCH in an SCell, deactivate one or more activated SCells in the activated state within the S-PCG to be added or changed. Therefore, in this embodiment, there is no need to transmit an explicit signalling message for deactivating these activated SCells within the S-PCG (i.e., Activation/Deactivation MAC CE) before the transmission of the DL signalling message (e.g., RRC Connection Reconfiguration message) for an S-PCG addition or S-PCG change involving configuring a PUCCH in an SCell. Further, in this embodiment, there is no need for release and re-addition of the activated SCells within the S-PCG to be added or changed. Accordingly, the apparatuses and the methods described in this embodiment can contribute to avoiding release and re-addition of one or more SCells and to reducing the number of control signallings (or the amount of control information) in order to configure, in a first SCell that has already been added or is to be newly added, a PUCCH to be used for transmission of the UCI for these one or more SCells.

Figure 2:
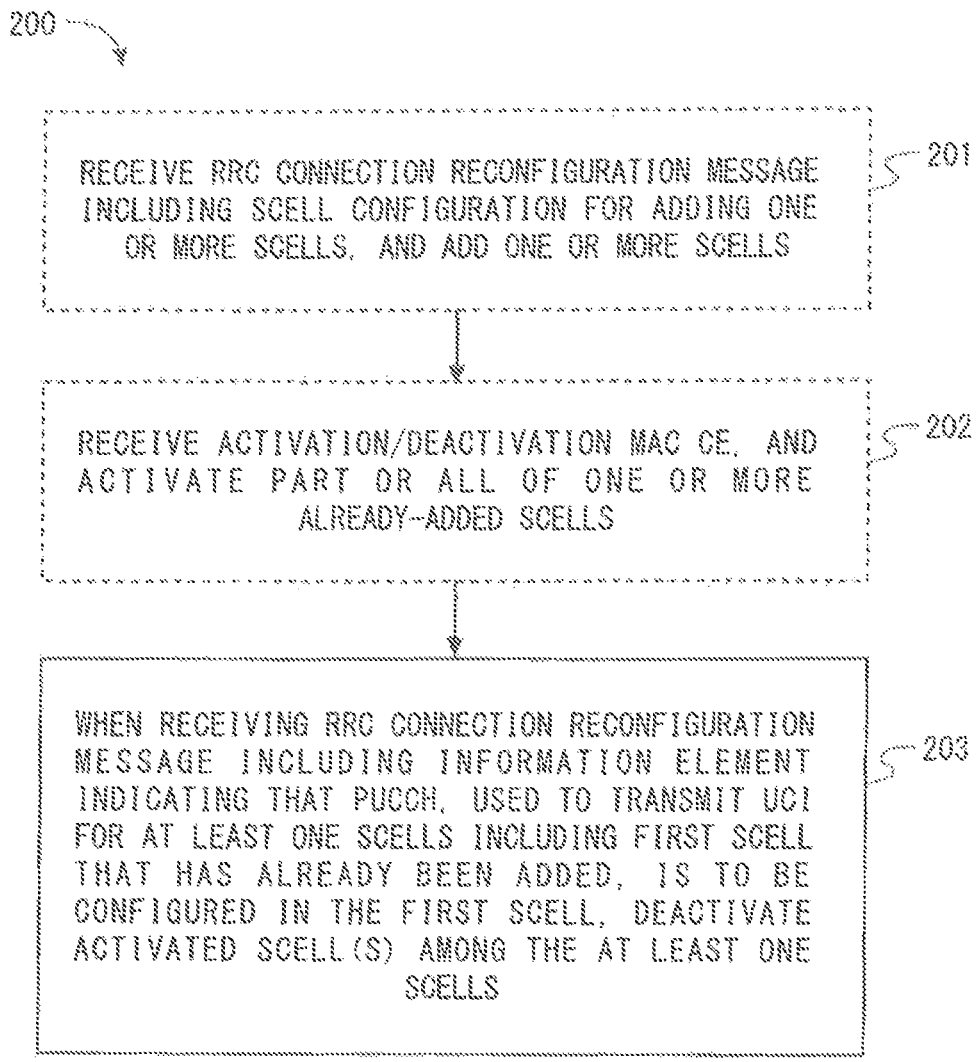
FIG. 2 is a flowchart showing one example of operations of a radio terminal according to a first embodiment.

FIG. 2 is a flowchart showing one example (Process 200) of the operations of the UE 1. Operations performed in Blocks 201 and 202 are similar to the configuration and activation of SCells in the existing CA. That is, in Block 201, the UE 1 receives from the eNB 2 an RRC CONNECTION RECONFIGURATION message including an SCell configuration for adding one or more SCells, and adds (or configures) the one or more SCells in accordance with the received message. In Block 202, the UE 1 receives an Activation/Deactivation MAC CE from the eNB 2 and activates part or all of the already-added one or more SCells in accordance with the MAC CE. That is, the UE 1 changes (or moves) a deactivated SCell(s) which the UE 1 has been instructed to activate, by the Activation/Deactivation MAC CE, to the activated state.

In Block 203, the UE 1 receives an RRC Connection Reconfiguration message indicating that a PUCCH is to be configured in a first SCell that has already been added or is to be newly added, where the PUCCH is to be used to transmit the UCI for at least one SCell (i.e., S-PCG) including this first SCell. In response to this message, the UE 1 deactivates the activated SCell(s) among the at least one SCell. The UE 1 keeps the deactivated SCell(s) among the at least one SCell in the deactivated state (or the UE 1 considers the deactivated SCell(s) to be continuously in the deactivated state).

Upon receiving the RRC Connection Reconfiguration message in Block 203, the UE 1 may stop transmission of the UCI (i.e., CSI reporting) for the activated SCell(s), which is destined to be deactivated, within a predetermined period of time based on the reception of the RRC Connection Reconfiguration message. The starting time of this predetermined period may be when the UE 1 receives the RRC Connection Reconfiguration message, when the UE 1 recognizes the content of the IIRC Connection Reconfiguration message, or when the RRC layer sets (or indicates) the lower layer(s) to deactivate the activated SCell(s). This predetermined period of time may be specified in units of subframes. For example, based on a concept similar to the existing SCell deactivation, the UE 1 may operate to stop CSI reporting by subframe #n+8 upon receiving, in subframe #n, the RRC Connection Reconfiguration message indicating that a PUCCH is to be configured in the first SCell.

According to the procedure shown in FIG. 2, the UE 1 does not need to receive an explicit MAC CE for deactivating the activated SCell(s) in the S-PCG before the reception of the RRC Connection Reconfiguration message in Block 203. Accordingly, the procedure shown in FIG. 2 can contribute to reducing the number of control signallings (or the amount of control information) to configure a PUCCH in the SCell.

Figure 3:
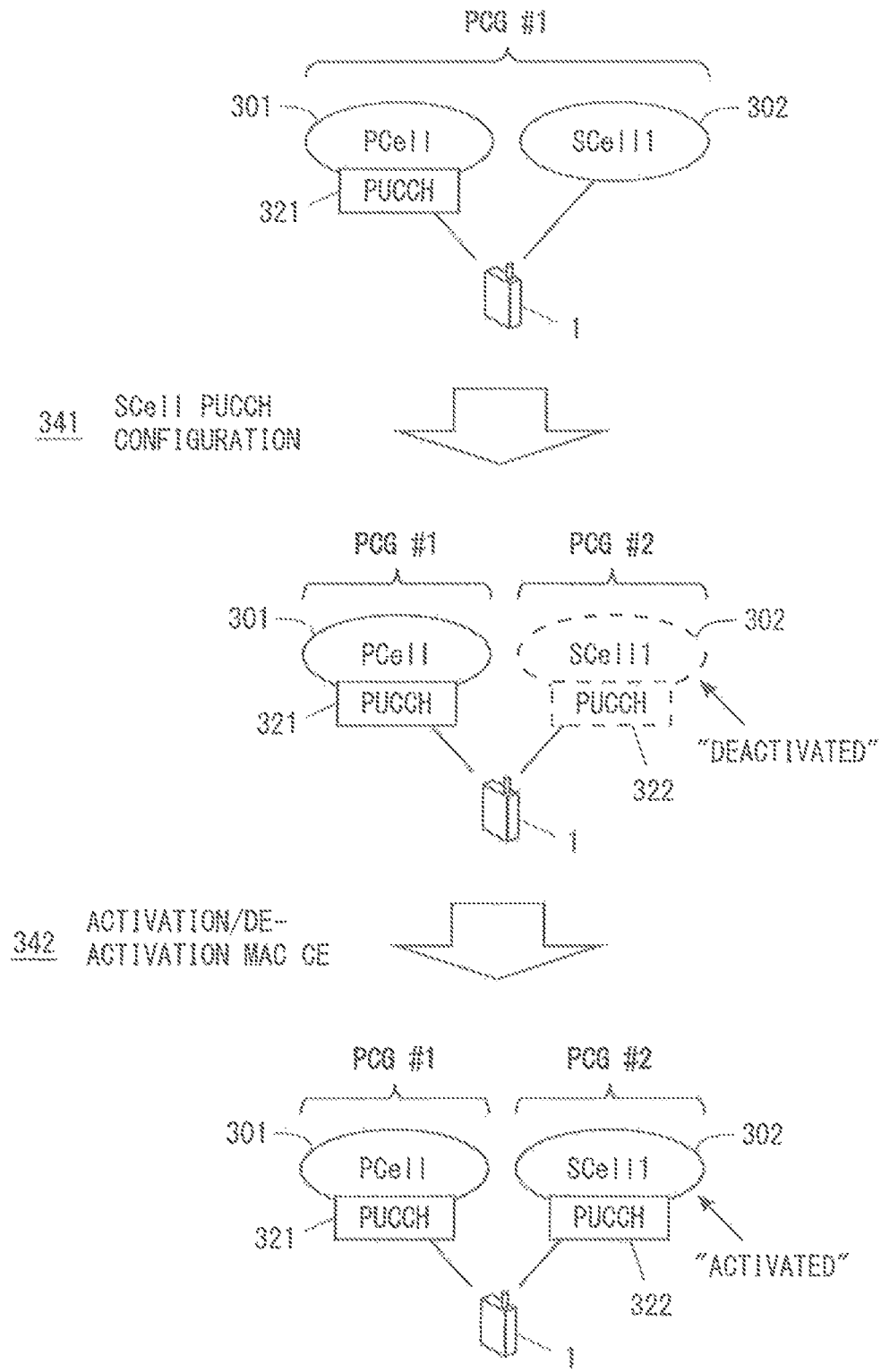
FIG. 3 is a diagram showing a first example of processing for adding a new S-PCG to the radio terminal.

The following provides some examples of configuring a PUCCH in the SCell along with the S-PCG addition. The PUCCH SCell of the S-PCG to be added may be an SCell that has belonged to the P-PCG or another S-PCG (i.e., already configured in the UE 1) or may be an SCell to be newly added to the UE 1 along with the S-PCG addition, FIG. 3 shows a first example of the S-PCG addition. In the example shown in FIG. 3, first, the UE 1 has been configured with PCG #1 (i.e., P-PCG) composed of a PCell 301 and an SCell 302 (SCell 1). The SCell 302 is being activated and thus the UE 1 transmits the UCI (in this example, CSI) for the PCell 301 and SCell 302 on a PUCCH 321 of the PCell 301.

Next, the UE 1 receives an RRC message 341 (e.g., RRC Connection Reconfiguration message) including an SCell PUCCH configuration. This SCell PUCCH configuration indicates an addition of a new PCG #2 (i.e., S-PCG) including the already-added SCell 302 and a configuration of a PUCCH 322 in the SCell 302. In other words, the SCell PUCCH configuration included in the RRC message 341 indicates that the UCI (e.g., CSI) for the SCell 302 is to be transmitted on the PUCCH 322 to be configured in the SCell 302. This SCell PUCCH configuration may include only configuration information regarding PCG #2 to be newly added, or It may include configuration information regarding all the PCGs, that is, configuration information regarding both PCG #1 and PCG #2.

Upon receiving the RRC message 341, the UE 1 recognizes that the PUCCH 322 is to be configured in the SCell 302 (SCell 1) and deactivates the SCell 302 (SCell 1). More specifically, the RRC layer of the UE 1 configures the lower layer(s) (i.e., MAC layer) to consider the SCell 302 (SCell 1) to be in the deactivated state. Then the MAC layer of the UE 1 deactivates the SCell 302, stops the sCellDeactivationTimer associated with the SCell 302 (SCell 1), and flushes all the Hybrid Automatic Repeat Request (HARQ) buffers associated with the SCell 302 (SCell 1). Further, the MAC layer of the UE 1 stops transmission of the UCI (e.g., CSI) for the SCell 302 (SCell 1) on the PUCCH 321 of the PCell 301. Upon receiving the RRC message 341, the UE 1 may be required to stop the transmission of the UCI (e.g., CSI) for the SCell 302 in the PCell 301 within the predetermined period of time based on the reception of the RRC message 341. Further, the sCellDeactivationTimer may not be applied (or used) to the SCell 302 (SCell 1), that is, PUCCH SCell.

Next, the UE 1 receives an Activation/Deactivation MAC CE 342 for activating the SCell 302 (SCell 1) from the eNB 2. The UE 1 activates the SCell 302 (SCell 1) in response to the reception of the Activation/Deactivation MAC CE 342. The UE 1 performs the following operations regarding the activated SCell 302 (SCell 1):

transmitting SRS on the SCell 302 when the uplink CA is configured;
monitoring a PDCCH on the SCell 302;
monitoring a PDCCH for the SCell 302 (on the PCell 301) in the case of cross-carrier scheduling; and
performing CSI reporting for the SCell 302.

Further, the UE 1 starts tor re-starts) the sCellDeactivationTimer associated with the SCell 302 (SCell 1) and triggers a Power Headroom Report (PHR). Further, similar to the existing CA, upon receiving the Activation/Deactivation MAC CE 342 in subframe #n, the UE 1 may be required to start to transmit a valid CSI report no later than in subframe #n+24 or #n+34.

Figure 4:
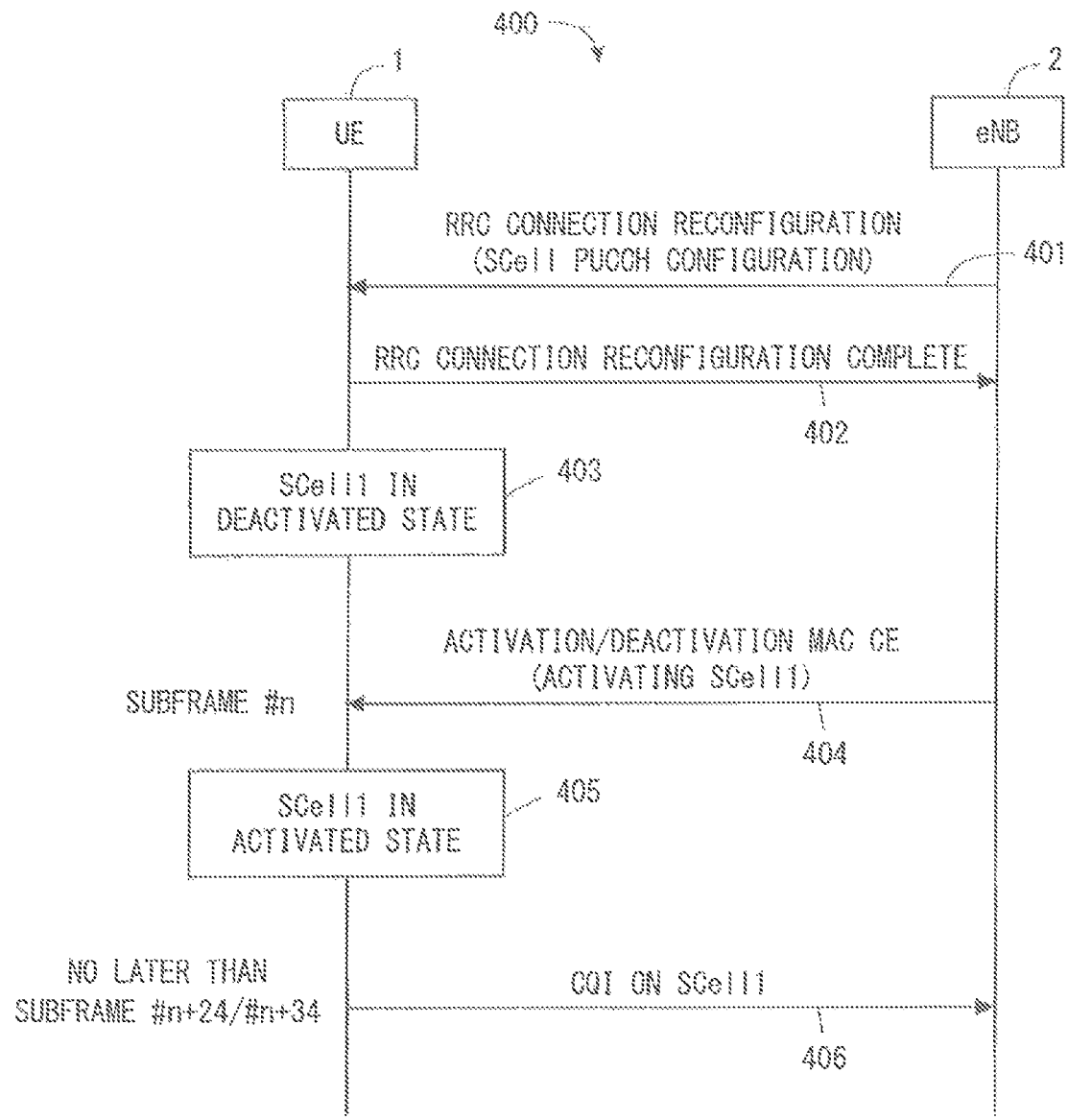
FIG. 4 is a sequence diagram showing one example of an S-PCG addition procedure regarding the first example shown in FIG. 4.

FIG. 4 is a sequence diagram showing one example (Process 400) of the S-PCG addition procedure regarding the first example shown in FIG. 3. Operations in Blocks 401-403 correspond to the reception of the RRC message 341 by the UE 1 shown in FIG. 3. That is, in Block 401, the eNB 2 transmits an RRC Connection Reconfiguration message including an SCell PUCCH configuration to the UE 1. In response to the reception of the RRC Connection Reconfiguration message, the UE 1 configures the PUCCH 322 in the SCell 302 (SCell 1), transmits an RRC Connection Reconfiguration Complete message to the eNB 2 (402), and deactivates the SCell 302 (SCell 1) (403). The time required for a UE to deactivate a cell depends on the processing power of the UE. Accordingly, the UE 1 may transmit the RRC Connection Reconfiguration Complete message to the eNB 2 after the start or completion of the deactivation of the SCell 302 SCell 1).

Operations in Blocks 404-406 correspond to the reception of the Activation/Deactivation MAC CE 342 by the UE 1 shown in FIG. 3. That is, in Block 404, the eNB 2 transmits an Activation/Deactivation MAC CE for activating the SCell 302 (SCell 1) to the UE 1. In response to the reception of the Activation/Deactivation MAC CE, the UE 1 activates the SCell 302 (SCell 1) (405). Further, upon receiving the Activation/Deactivation MAC CE in subframe #n, the CE 1 starts to transmit a valid CSI (CQI) regarding the SCell 302 (SCell 1) on the PUCCH 322 of the SCell 302 (SCell 1) no later than in subframe #+24 or #n+34 (406).

Figure 5:
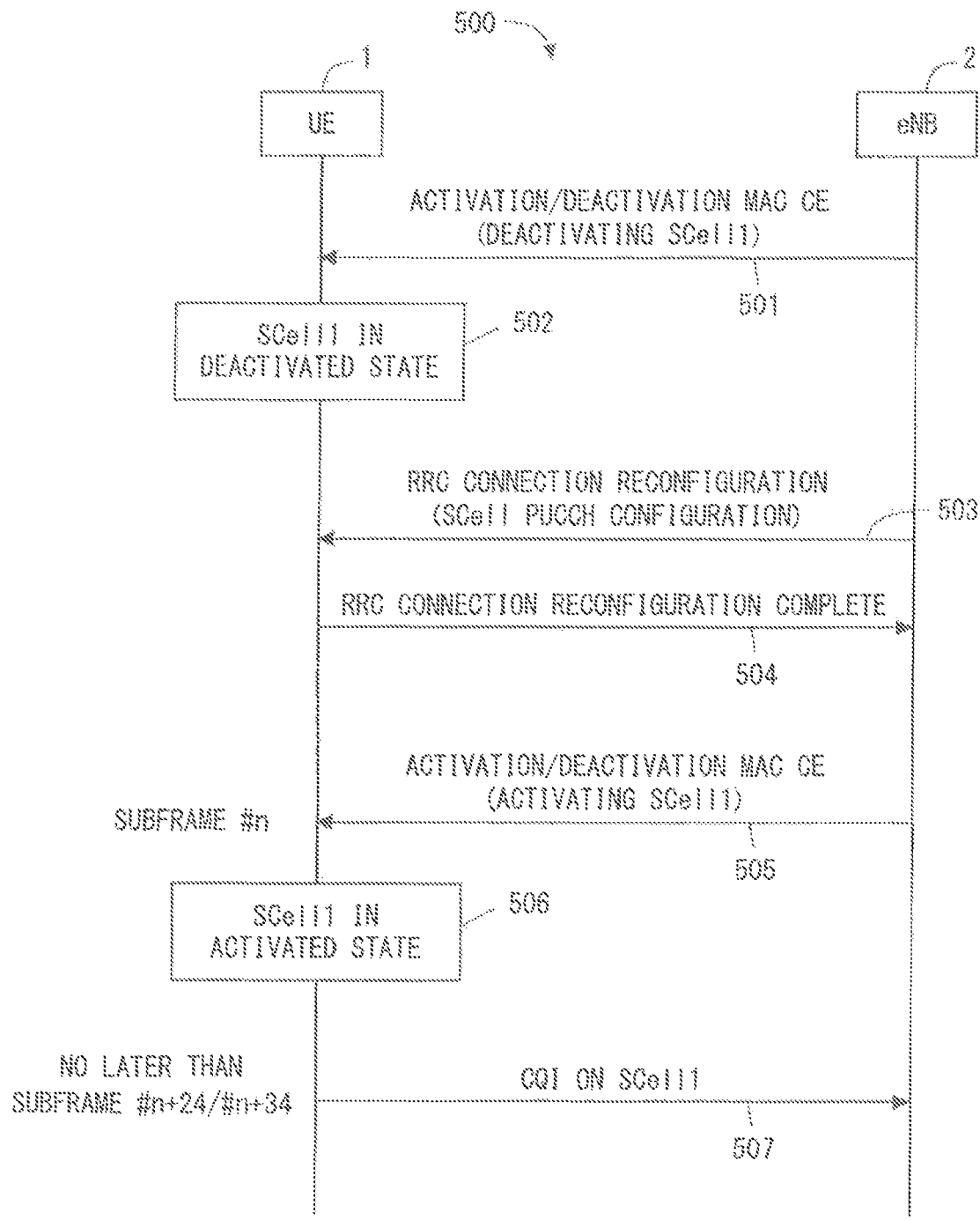
FIG. 5 is a sequence diagram showing one example of an S-PCG addition procedure according to a comparative example.

FIG. 5 shows a comparative example (Process 500) of the S-PCG addition procedure. In the example shown in FIG. 5, in Block 501, the eNB 2 explicitly transmits an Activation/Deactivation MAC CE for deactivating the SCell 302 (SCell 1) to the UE 1. In response to the Activation/Deactivation MAC CE, the UE 1 deactivates the SCell 302 (SCell 1) (502). After that, in Block 503, the eNB 2 transmits to the UE 1 an RRC Connection Reconfiguration message including an SCell PUCCH configuration. In response to the reception of the RRC Connection Reconfiguration message, the UE 1 configures the PUCCH 322 in the SCell 302 (SCell 1) and transmits an RRC Connection Reconfiguration Complete message to the eNB 2 (504). The processes in Blocks 505-507 are similar to the processes in Blocks 404-406 in FIG. 4.

As understood from the comparison between FIG. 4 and FIG. 5, the example shown in FIG. 4 does not require transmission of an explicit Aestivation/Deactivation MAC CE for deactivating the SCell 302 (SCell 1) in which the PUCCH 322 is configured (i.e., Block 501 in FIG. 5). Therefore, as compared to the procedure shown in FIG. 5, FIG. 4 can reduce the number of control signallings (or the amount of control information) in order to configure the PUCCH 322 in the SCell 302 (SCell 1).

Figure 6:
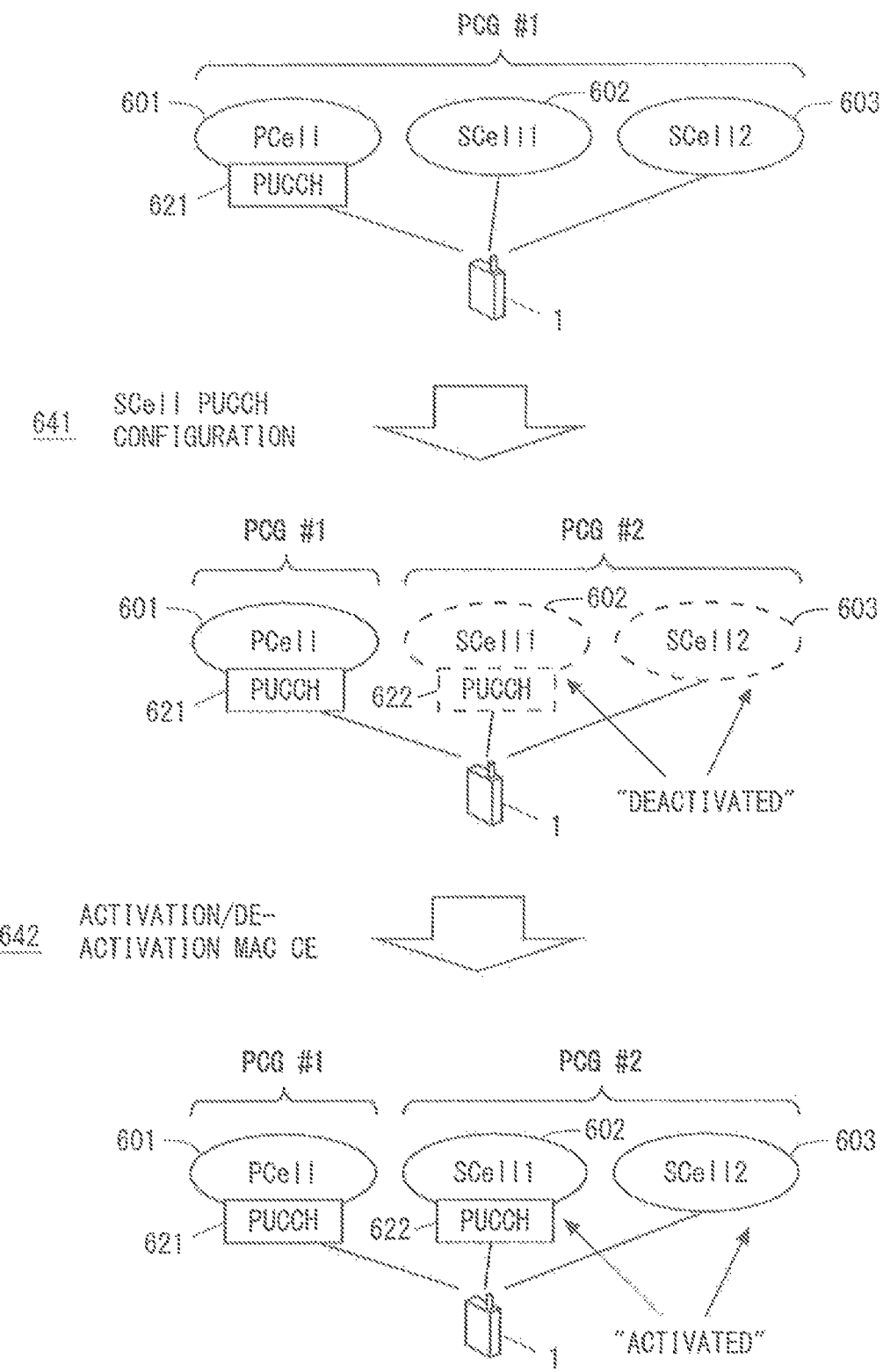
FIG. 6 is a diagram showing a second example of the processing for adding a new S-PCG to the radio terminal according to the first embodiment.

FIG. 6 shows a second example regarding the S-PCG addition. In the example shown in FIG. 6, first, the UE 1 has been configured with PCG #1 (i.e., P-PCG) composed of a PCell 601, an SCell 602 (SCell 1), and an SCell 603 (SCell 2). The SCells 602 and 603 are being activated and thus the UE 1 transmits the UCI (e.g., CSI) for the PCell 601 and SCells 602 and 603 on a PUCCH 621 of the PCell 601.

Next, the UE 1 receives an RRC message 641 (e.g., RRC Connection Reconfiguration message) including an SCell PUCCH configuration. This SCell PUCCH configuration indicates an addition of a new PCG #2 (i.e., S-PCG) including the already-added SCells 602 and 603 and a configuration of a PUCCH 622 in the SCell 602 (SCell 1). In other words, the SCell PUCCH configuration included in the RRC message 641 indicates that the UCI (e.g., CSI) for the SCells 602 and 603 is to be transmitted on the PUCCH 622 to be configured in the SCell 602. This SCell PUCCH configuration may include only configuration information regarding PCG #2 to be newly added, or it may include configuration information regarding ail the PCGs, that is, configuration information regarding both PCG #1 and PCG #2.

Upon receiving the RRC message 641, the UE 1 recognizes that the PUCCH 622 is to be configured in the SCell 602 (SCell 1), deactivates the SCell 602 (SCell 1), and further deactivates the SCell 603 (SCell 2), The processes performed by the RRC layer and MAC layer of the UE 1 and specific examples of the requirements imposed on the UE 1 to stop CSI reporting are similar to those described above with reference to FIG. 3.

Figure 7:
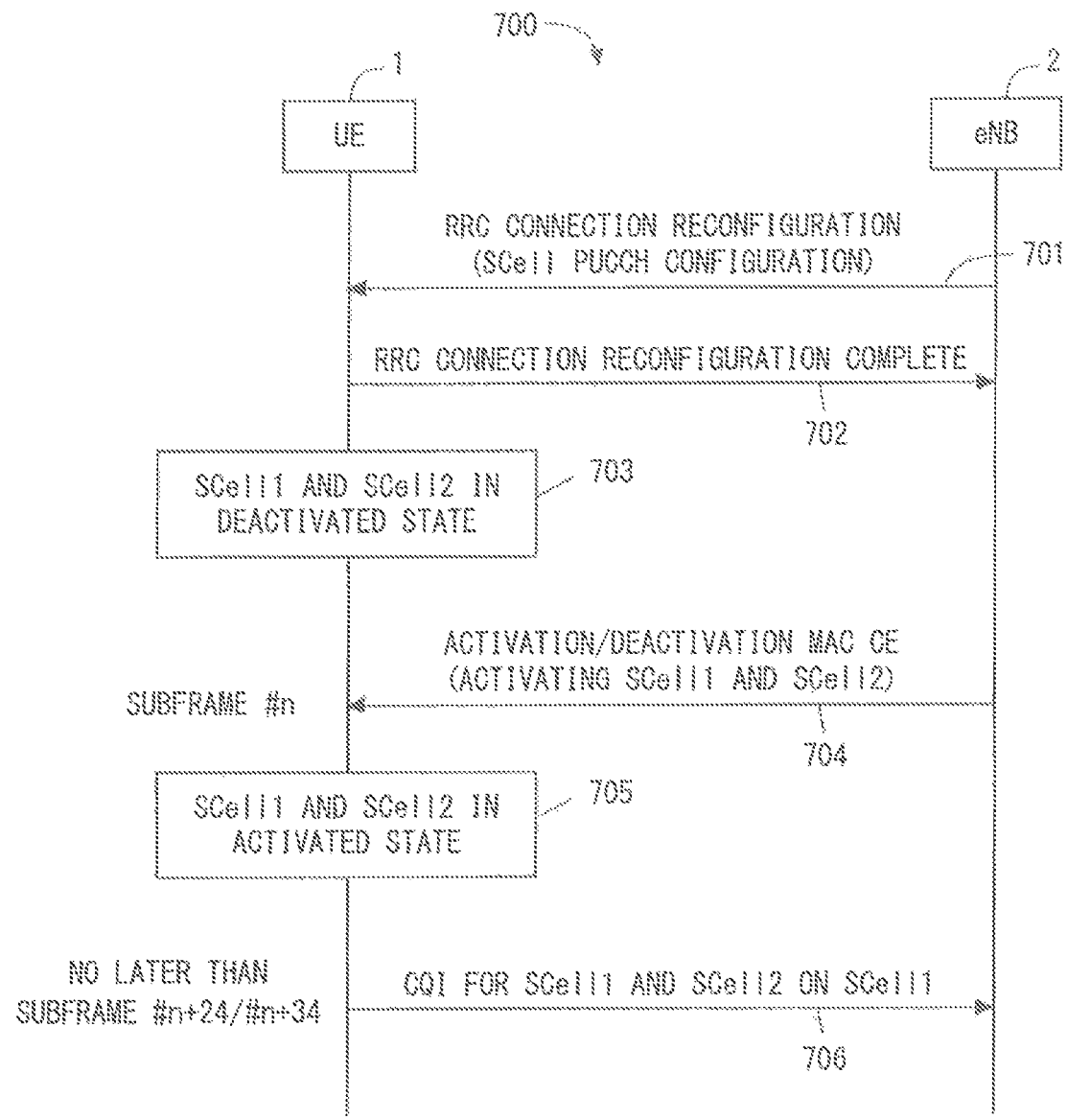
FIG. 7 is a sequence diagram showing one example of the S-PCG addition procedure regarding the second example shown in FIG. 6.

Next, the UE 1 receives an Activation/Deactivation MAC CE 642 for activating the SCells 602 and 603 from the eNB 2. The UE 1 activates the SCells 602 and 603 in response to the reception of the Activation/Deactivation MAC CE 642. The operations of the UE 1 regarding the activated SCells 602 and 603 and specific examples of the requirements imposed on the UE 1 to start (or re-start) CSI reporting are similar to those described above with reference to FIG. 3, FIG. 7 is a sequence diagram showing one example (Process 700) of the S-PCG addition procedure regarding the second example shown in FIG. 6. The processes of Blocks 701-706 shown in FIG. 7 are basically similar to the processes in Blocks 401-406 shown in FIG. 4. However, the RRC Connection Reconfiguration message transmitted in Block 701 indicates that the UCI (e.g., CSI) for the SCells 602 and 603 is to be transmitted on the PUCCH 622 of the SCell 602. In other words, the RRC Connection Reconfiguration message transmitted in Block 701 indicates that PCG #2 (i.e., S-PCG) including the SCells 602 and 603 is newly added. Accordingly, the UE 1 deactivates the SCells 602 and 603 in Block 703. Further, in Block 704, the UE 1 receives the Activation/Deactivation MAC CE for activating the SCells 602 and 603, thereby activating the SCells 602 and 603 (705). Upon receiving the Activation/Deactivation MAC CE in subframe #n, the UE 1 starts to transmit a valid CSI (CQI) regarding the SCells 602 and 603 on the PUCCH 622 of the SCell 602 (SCell 1) no later than in subframe #n+24 or #n+34 (706).

Figure 8:
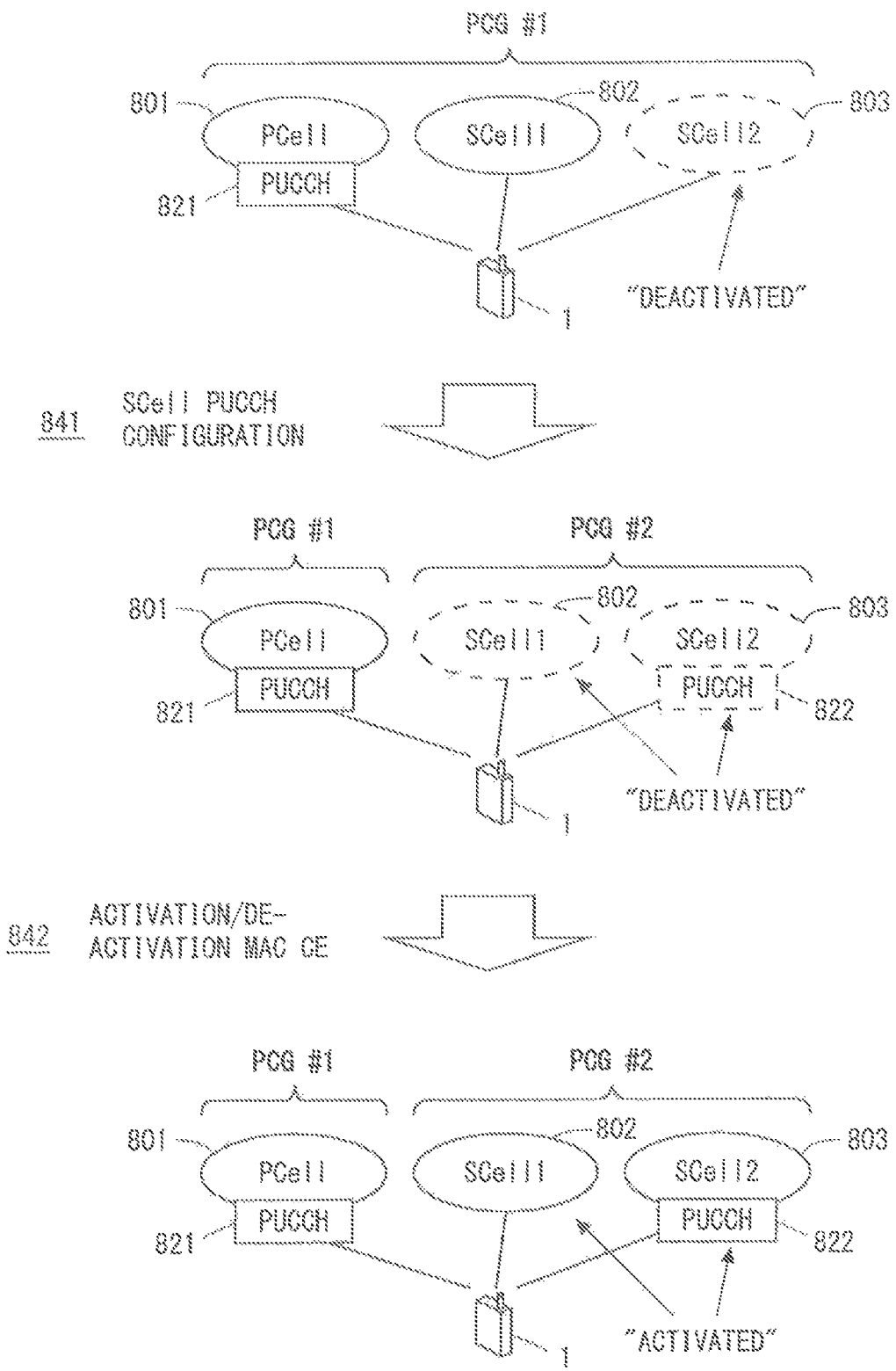
FIG. 8 is a diagram showing a third example of the processing for adding a new S-PCG to the radio terminal according to the first embodiment.

FIG. 8 shows a third example regarding the S-PCG addition. In the example shown in FIG. 8, first, the UE 1 has been configured with PCG #1 (i.e., P-PCG) composed of a PCell 801, an SCell 802 (SCell 1), and an SCell 803 (SCell 2). The SCell 802 is being in the activated state, and the SCell 803 is being in the deactivated state. Thus, the UE 1 transmits the UCI (e.g., CSI) for the PCell 801 and the SCell 802 (SCell 1) on a PUCCH 821 of the PCell 801, but it does not perform CSI reporting for the SCell 803 (SCell 2).

Next, the UE 1 receives an RRC message 841 (e.g., RRC Connection Reconfiguration message) including an SCell PUCCH configuration. This SCell PUCCH configuration indicates an addition of a new PCG #2 (i.e., S-PCG) including the already-added SCells 802 and 803 and a configuration of a PUCCH 822 in the SCell 803 (SCell 2). In other words, the SCell PUCCH configuration included in the RRC message 841 indicates that the UCI (e.g., CSI) for the SCells 802 and 803 is to be transmitted on the PUCCH 822 to be configured in the SCell 803. This SCell PUCCH configuration may include only configuration information regarding PCG #2 that is to be newly added, or it may include configuration information regarding all the PCGs, that is, configuration information regarding both PCG #1 and PCG #2.

Upon receiving the RRC message 841, the UE 1 recognizes that the PUCCH 822 is to be configured in the SCell 803 (SCell 2) that is in the deactivated state and also recognizes that not only the UCI (e.g., CSI) for the SCell 803 (SCell 2) but also the UCI (e.g., CSI) for the SCell 802 (SCell 1) are to be transmitted on the PUCCH 822. In response to this, the UE 1 keeps the deactivated SCell 803

(SCell 2) in the deactivated state and further deactivates the activated SCell 802 (SCell 1). The processes of the RRC layer and MAC layer of the UE 1 and specific examples of the requirements imposed on the UE 1 to stop CSI reporting are similar to those described above with reference to FIG. 3.

Next, the UE 1 receives an Activation/Deactivation MAC CE 842 for activating the SCells 802 and 803 from the eNB 2. The UE 1 activates the SCells 802 and 803 in response to the reception of the Activation/Deactivation MAC CE 842. The operations of the UE 1 regarding the activated SCells 802 and 803 and specific examples of the requirements imposed on the UE 1 to start (or re-start) CSI reporting are similar to those described above with reference to FIG. 3.

Figure 9:
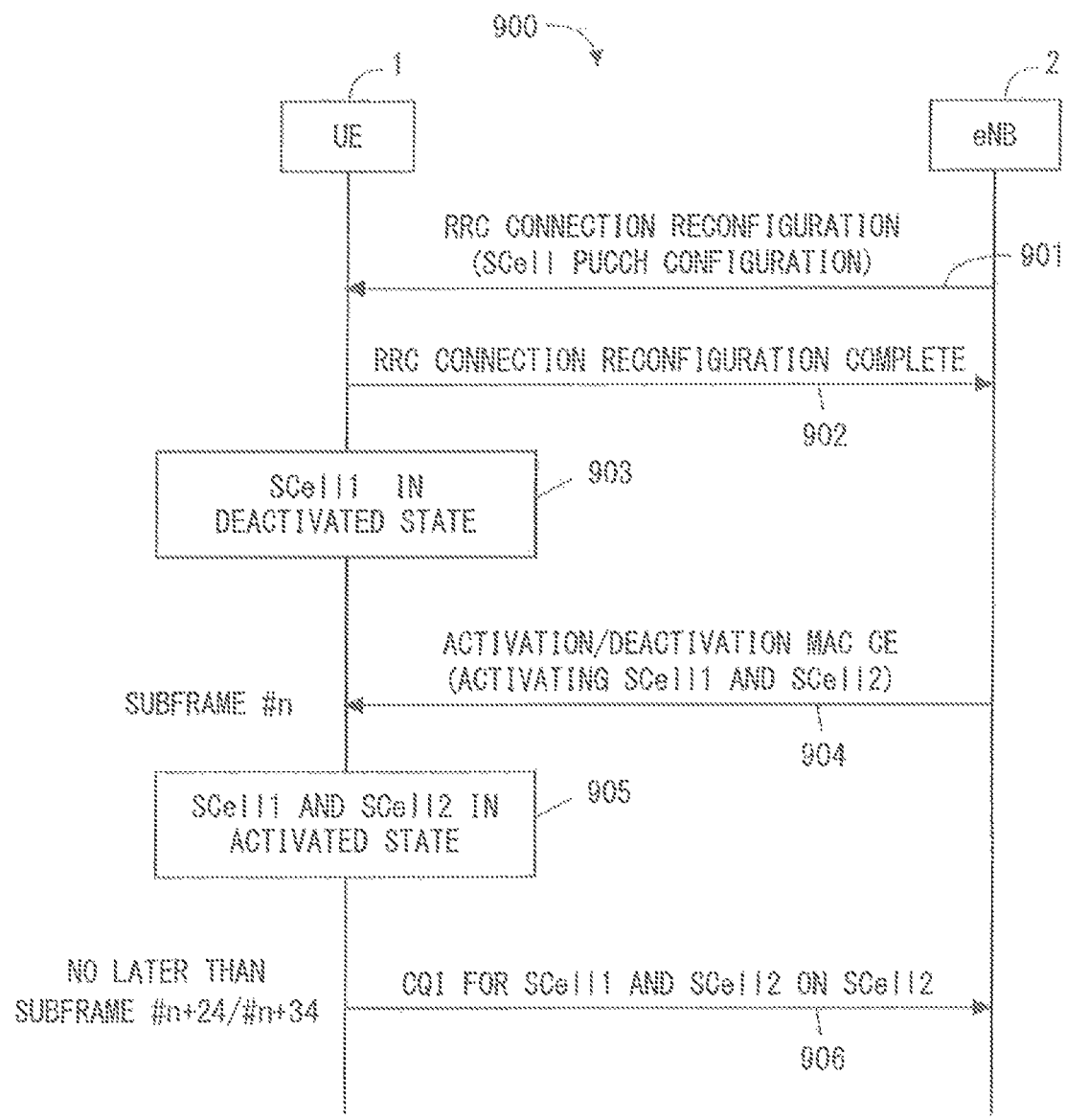
FIG. 9 is a sequence diagram showing one example of the S-PCG addition procedure regarding the third example shown in FIG. 8.

FIG. 9 is a sequence diagram showing one example (Process 900) of the S-PCG addition procedure regarding the third example shown in FIG. 8. The processes in Blocks 901-906 shown in FIG. 9 are basically similar to the processes in Blocks 401-406 shown in FIG. 4. However, the RRC Connection Reconfiguration message transmitted in Block 901 indicates that the UCI (e.g., CSI) for the SCells 802 and 803 is to be transmitted on the PUCCH 822 of the SCell 803. In other words, the RRC Connection Reconfiguration message transmitted in Block 901 indicates that PCG #2 (i.e., S-PCG) including the SCells 802 and 803 is newly added. Accordingly, in Block 903, the UE 1 deactivates the SCell 802, which is in the activated state among the SCells 802 and 803. Further, in Block 904, the UE 1 receives the Activation/Deactivation MAC CE for activating the SCells 802 and 803, thereby activating the SCells 802 and 803 (905). Upon receiving the Activation/Deactivation MAC CE in subframe #n, the UE 1 starts to transmit a valid CSI (CQI) regarding the SCells 802 and 803 on the PUCCH 822 of the SCell 803 (SCell 2) no later than in subframe #n+24 or #n+34 (906).

Figure 10:
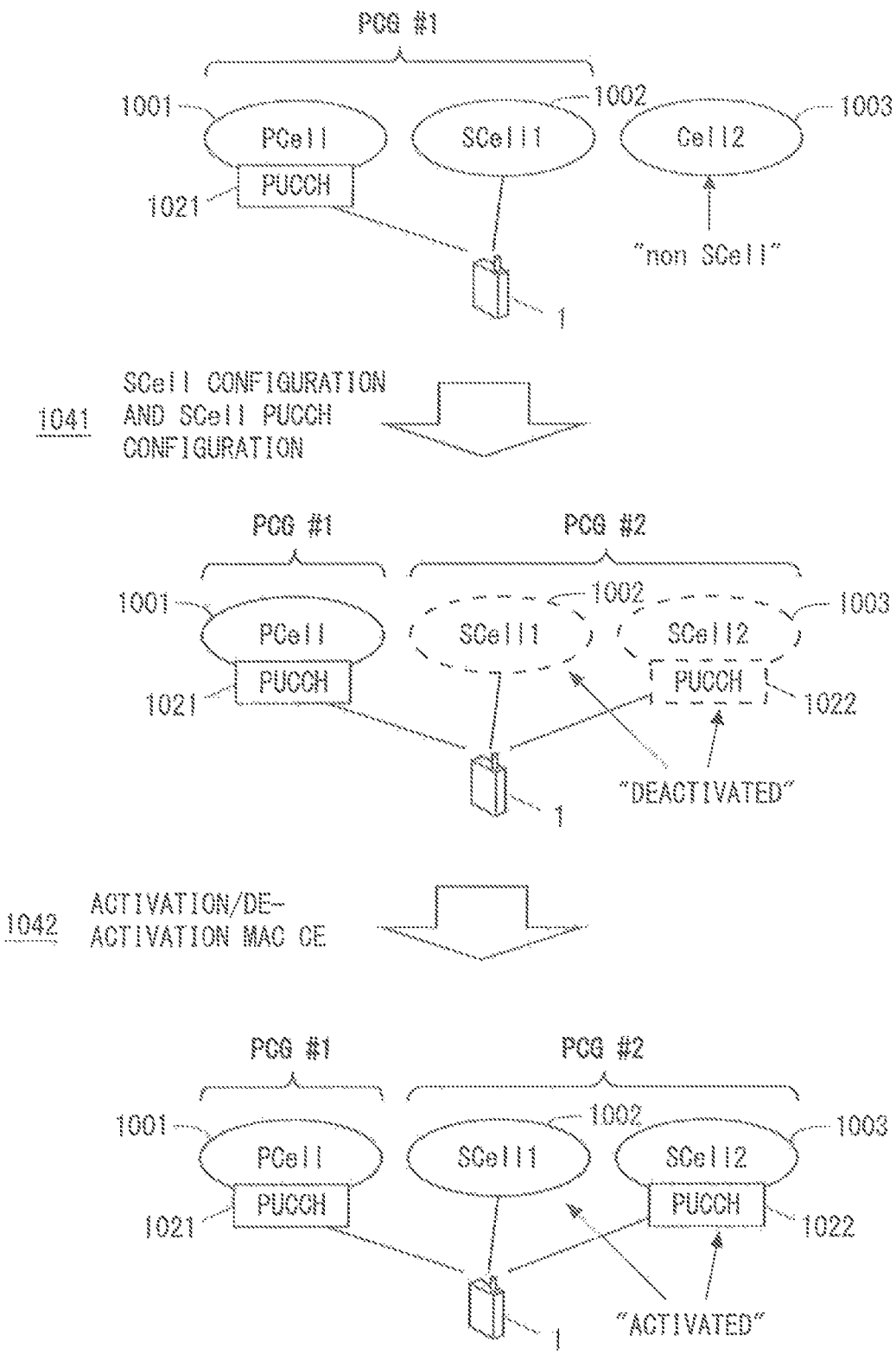
FIG. 10 is a diagram showing a fourth example of the processing for adding a new S-PCG to the radio terminal according to the first embodiment.

FIG. 10 shows a fourth example regarding the S-PCG addition. In the example shown in FIG. 10, a new SCell is added to the UE 1 along with the S-PCG addition and this new SCell is configured to be a PUCCH SCell.

In FIG. 10, first, the UE 1 has been configured with PCG #1 (i.e., P-PCG) composed of a PCell 1001 and an SCell 1002 (SCell 1), The SCell 1002 is being in the activated state. A Cell 1003 (Cell 2) is a cell or CC that is not yet configured in the UE 1.

Next, the UE 1 receives an RRC message 1041 (e.g., RRC Connection Reconfiguration message) including an SCell configuration and SCell PUCCH configuration. The SCell configuration indicates that the Cell 1003 is to be added, to the UE 1 as an SCell. Further, the SCell PUCCH configuration indicates an addition of a new PCG #2 (i.e., S-PCG) composed of the already-added SCell 1002 (SCell 1) and the newly added SCell 1003 (SCell 2) and a configuration of a PUCCH 1022 in the SCell 1003 (SCell 2). In other words, the SCell PUCCH configuration included in the RRC message 1041 indicates that the UCI (e.g., CSI) for the SCells 1002 and 1003 is to be transmitted on the PUCCH 1022 to be configured in the SCell 1003. This SCell PUCCH configuration may include only configuration information regarding PCG #2 that is to be newly added or may include configuration information regarding all the PCGs, that is, configuration information regarding both PCG #1 and PCG #2.

Upon receiving the RRC message 1041, the UE 1 adds the SCell 1003 (SCell 2). Similar to the existing CA, the added SCell 1003 (SCell 2) is initially in the deactivated state. The UE 1 further recognizes that the PUCCH 1022 is to be configured in the new SCell 1003 (SCell 2) and also recognizes that not only the UCI (e.g., CSI) for the SCell 1003 (SCell 2) but also the UCI (e.g., CSI) for the SCell 1002 (SCell 1) are to be transmitted on the PUCCH 1022. In response to this, the UE 1 keeps the SCell 1003 (SCell 2), which has been newly added and is in the deactivated state, in the deactivated state and further deactivates the activated SCell 1002 (SCell 1). The processes of the RRC layer and MAC layer of the UE 1 and specific examples of the requirements imposed on the UE 1 to stop CSI reporting are similar to those described above with reference to FIG. 3.

Next, the UE 1 receives an Activation/Deactivation MAC CE 1042 for activating the SCells 1002 and 1003 from the eNB 2. In response to the reception of the Activation/Deactivation MAC CE 1042, the UE 1 activates the SCells 1002 and 1003. The operations of the UE 1 regarding the activated SCells 1002 and 1003 and specific examples of the requirements imposed on the UE 1 to start (or re-start) CSI reporting are similar to those described above with reference to FIG. 3.

Figure 11:
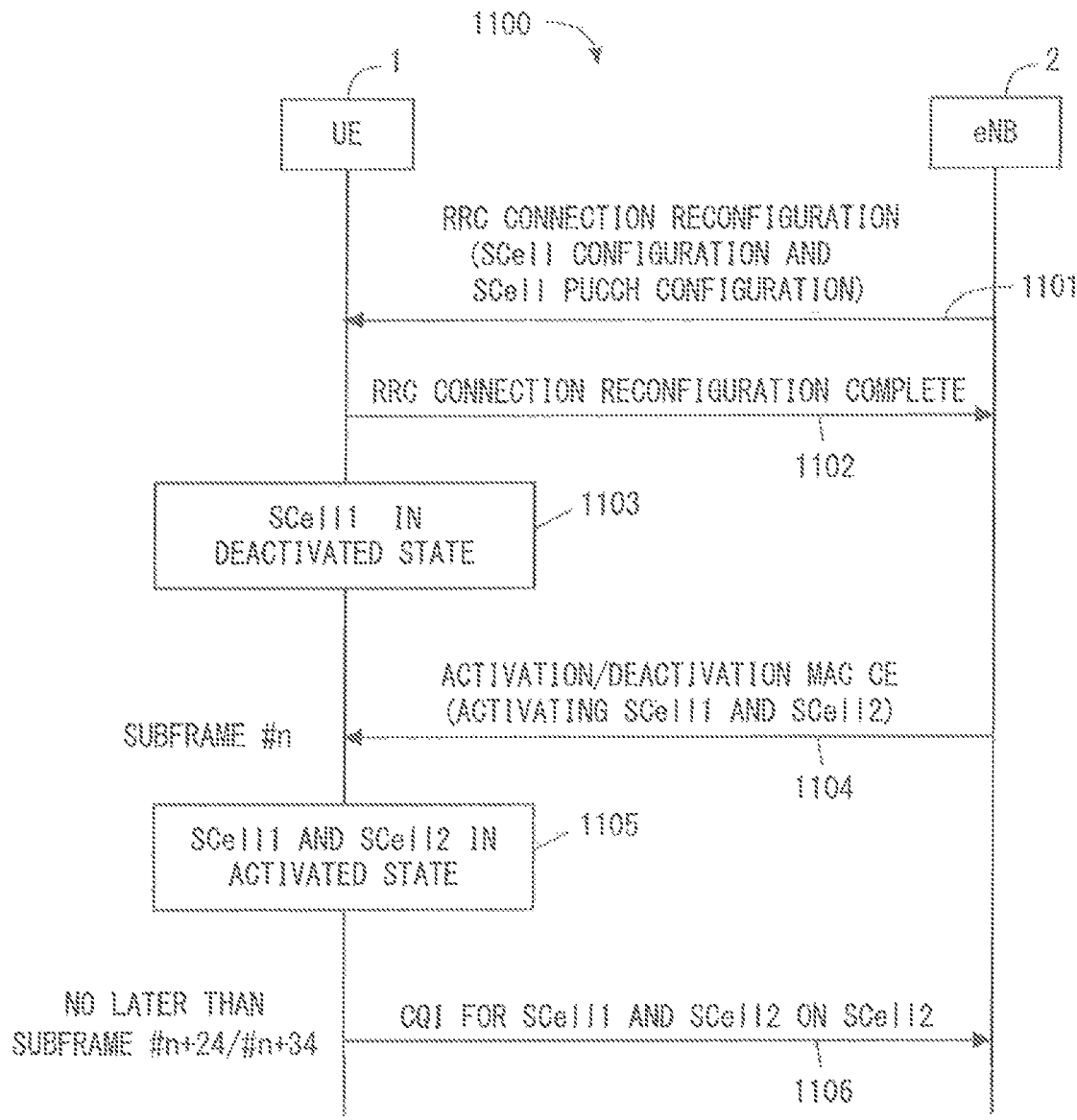
FIG. 11 is a sequence diagram showing one example of the S-PCG addition procedure regarding the fourth example shown in FIG. 10.

FIG. 11 is a sequence diagram showing one example (Process 1100) of the S-PCG addition procedure regarding the fourth example shown in FIG. 10, The processes in Blocks 1101-1106 shown in FIG. 11 are basically similar to the processes in Blocks 901-906 shown in FIG. 9. However, the RRC Connection Reconfiguration message transmitted in Block 1101 includes the SCell configuration to add the new SCell 1003 to the UE 1.

The following provides some examples for configuring a PUCCH in the SCell along with the S-PCG change. As described above, the S-PCG change herein means the procedure for changing the PUCCH SCell within the already-added S-PCG. The PUCCH SCell after the S-PCG change may be an SCell that has belonged to the S-PCG before the S-PCG change, an SCell that has belonged to the P-PCG or another S-PCG before the S-PCG change, or may be an SCell to be newly added to the UE 1 along with the S-PCG change.

Figure 12:
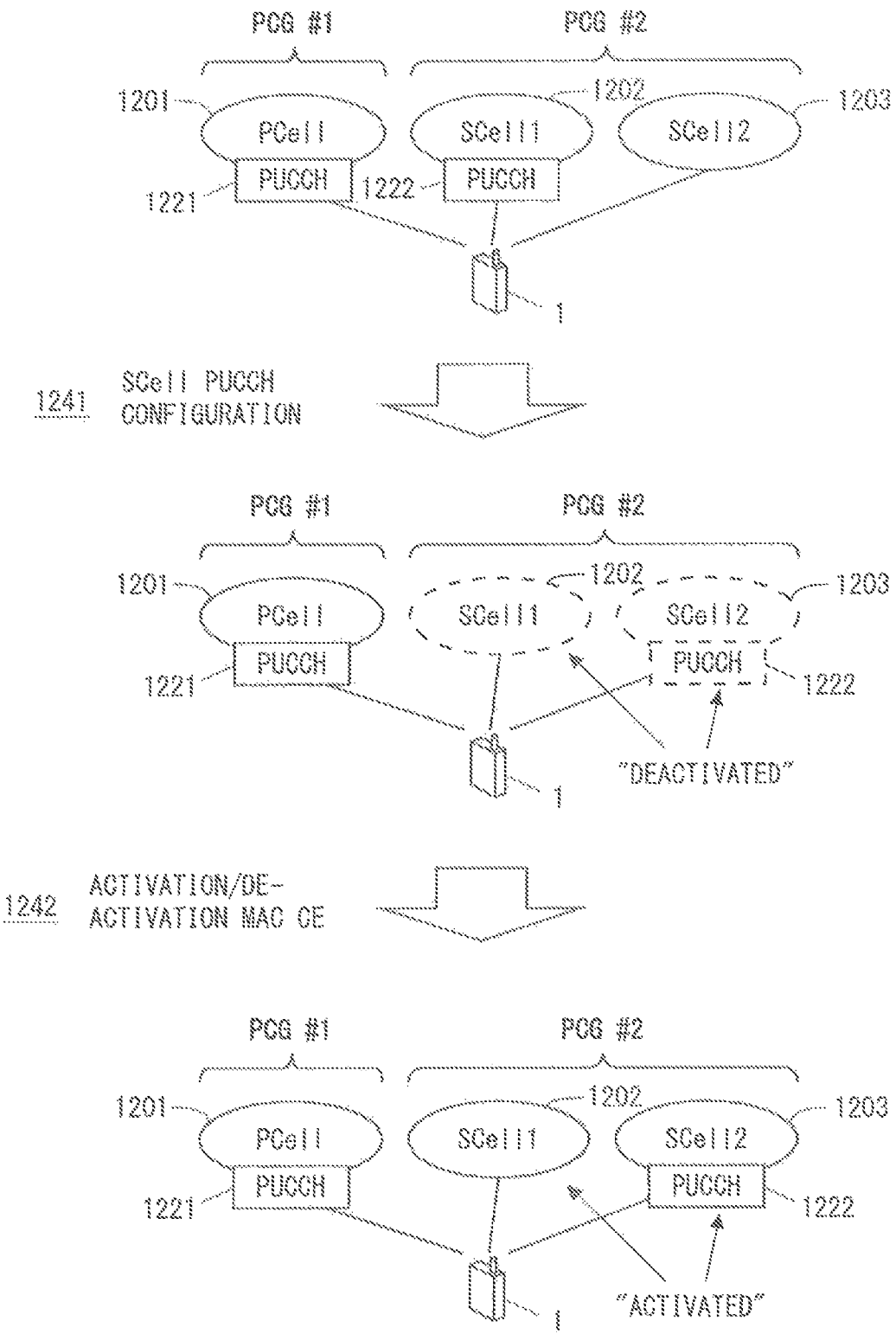
FIG. 12 is a diagram showing one example of processing for changing an S-PCG already configured in the radio terminal, which involves change of the PUCCH SCell.

FIG. 12 shows one example of the S-PCG change, in the example shown in FIG. 12, first, the UE 1 has been configured with PCG #1 (i.e., P-PCG) composed only of a PCell 1201 and with PCG #2 (i.e., S-PCG) composed of SCells 1202 (SCell 1) and 1203 (SCell 2). The PUCCH SCell in PCG #2 is the SCell 1202 (SCell 1) and the SCells 1202 and 1203 are being activated. Thus, the UE 1 transmits the UCI (e.g., CSI) for the PCell 1201 on a PUCCH 1221 of the PCell 1201 and transmits the UCI (e.g., CSI) for the SCells 1202 and 1203 on a PUCCH 1222 of the SCell 1202.

Next, the UE 1 receives an RRC message 1241 (e.g., RRC Connection Reconfiguration message) including an SCell PUCCH configuration. This SCell PUCCH configuration indicates that the SCell (i.e., PUCCH SCell) on which the PUCCH 1222 is transmitted is changed from the SCell 1202 (SCell 1) to the SCell 1203 (SCell 2). This SCell PUCCH configuration may include configuration information regarding only PCG #2 to be changed, or it may include configuration information regarding all the PCGs, that is, configuration information regarding both PCG #1 and PCG #2.

Upon receiving the RRC message 1241, the UE 1 recognizes that the PUCCH SCell is to be changed from the SCell 1202 (SCell 1) to the SCell 1203 (SCell 2). In response to this, the UE 1 deactivates the SCells 1202 and 1203, The processes of the RRC layer and MAC layer of the UE 1 and specific examples of the requirements imposed on the UE 1 to stop CSI reporting are similar to those described above with reference to FIG. 3.

Next, the UE 1 receives an Activation/Deactivation MAC CE 1242 for activating the SCells 1202 and 1203 from the eNB 2, in response to the reception of the Activation/ Deactivation MAC CE 1242, the UE 1 activates the SCells 1202 and 1203, The operations of the UE 1 regarding the activated SCells 1202 and 1203 and specific examples of the requirements imposed on the UE 1 to start (or re-start) CSI reporting are similar to those described above with reference to FIG. 3.

A specific example of the procedure regarding the example of the S-PCG change shown in FIG. 12 is similar to that shown in FIG. 7.

FIG. 12 shows an example in which a PUCCH is configured in the SCell 1203 that has already been added when the S-PCG (PCG #2) is changed. However, a new SCell may be added to the UE 1 and this new SCell may be configured to be a PUCCH SCell of PCG #2.

The following provides an example in which a new SCell is added to the already-added S-PCG. It should be noted that the addition or change of the PUCCH SCell does not performed in the example of the SCell addition described here, unlike in the examples of the PCG addition and PCG change described with reference to FIGS. 3-12.

Figure 13:
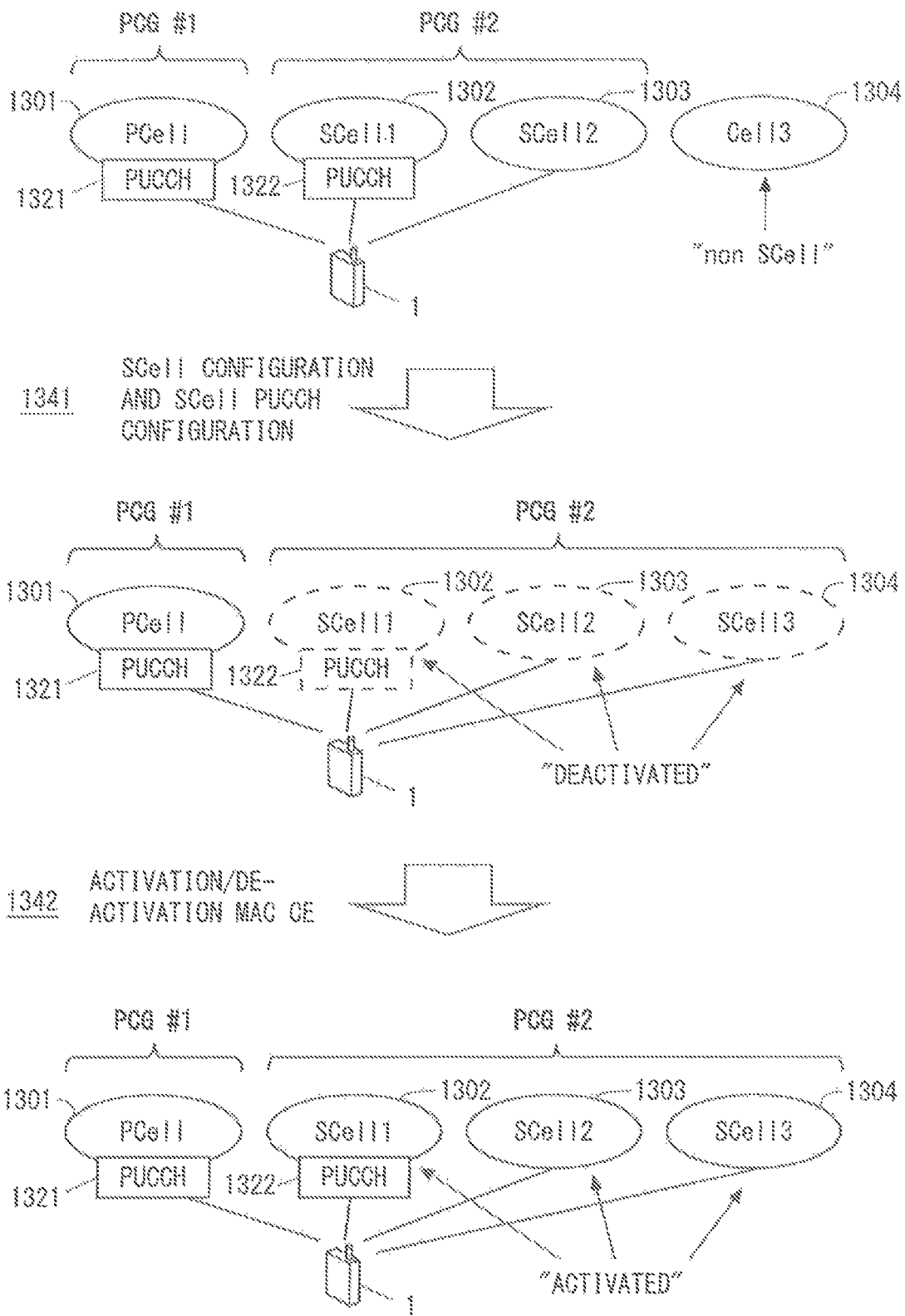
FIG. 13 is a diagram showing one example of processing for adding an SCell to an S-PCG already configured in the radio terminal.

In the example shown in FIG. 13, first, the UE 1 has been configured with PCG #1 (i.e., P-PCG) composed only of a PCell 1301 and with PCG #2 (i.e., S-PCG) composed of SCells 1302 (SCell 1) and 1303 (SCell 2). A Cell 1304 (Cell 3) is a cell or CC that is not yet configured in the UE 1. The PUCCH SCell in PCG #2 is the SCell 1302 (SCell 1) and the SCells 1302 and 1303 are being activated. Thus, the UE 1 transmits the UCI (e.g., CSI) for the PCell 1301 on a PUCCH 1321 of the PCell 1301 and transmits the UCI (e.g., CSI) for the SCells 1302 and 1303 on a PUCCH 1322 of the SCell 1302 (SCell 1).

Next, the UE 1 receives an RRC message 1341 (e.g., RRC Connection Reconfiguration message) including an SCell configuration and SCell PUCCH configuration. The SCell configuration indicates that the Cell 1304 is to be added to the UE 1 as an SCell. Further, the SCell PUCCH configuration indicates that the UCI (e.g., CSI) for the new SCell 1304 (SCell 3) is to be transmitted on the PUCCH 1322 of the SCell 1302 (SCell 1). In other words, the SCell PUCCH configuration indicates that reconfiguration of the existing PCG #2 is to be performed to add the new SCell 1304 (SCell 3.

Upon receiving the RRC message 1341, the UE 1 adds the SCell 1304 (SCell 3). Similar to the existing CA, the added SCell 1304 (SCell 3) is initially in the deactivated state. In some implementations, as shown in FIG. 13, the UE 1 may deactivate the existing SCells 1302 and 1303 included in PCG #2 to which the SCell 1304 (SCell 3) is added. Alternatively, in some implementations, the UE 1 may not change the activation status of the existing SCells 1302 and 1303 in PCG #2 to which the SCell 1304 (SCell 3) is added and, accordingly, may keep the SCells 1302 and 1303 in the activated state.

Next, the UE 1 receives an Activation/Deactivation MAC CE 1342 from the eNB 2. The Activation/Deactivation MAC CE 1342 instructs the UE 1 to activate the SCell 1304. Further, if the SCells 1302 and 1303 is in the deactivated state, the Activation/Deactivation MAC CE 1342 further instructs the UE 1 to activate the SCells 1302 and 1303. In response to the reception of the Activation/Deactivation MAC CE 1342, the UE 1 activates the SCell 1304 (and the SCells 1302 and 1303). The operations of the UE 1 regarding the activated SCells and specific examples of the requirements imposed on the UE 1 to start (or re-start) CSI reporting are similar to those described above with reference to FIG. 3.

The following provides an example in which an SCell(s) other than the SCell on which PUCCH is transmitted (i.e., PUCCH SCell) is replaced between an already-configured S-PCG and the already-configured P-PCG or between already-configured S-PCGs. This replacement of SCell(s) between PCGs that do not involve change of the PUCCH SCell is herein referred to as "PCG reconfiguration", It should be noted that the addition or change of the PUCCH SCell does not performed in the example of the PCG reconfiguration described here, unlike in the examples of the PCG addition and PCG change described with reference to FIGS. 3-9.

Figure 14:
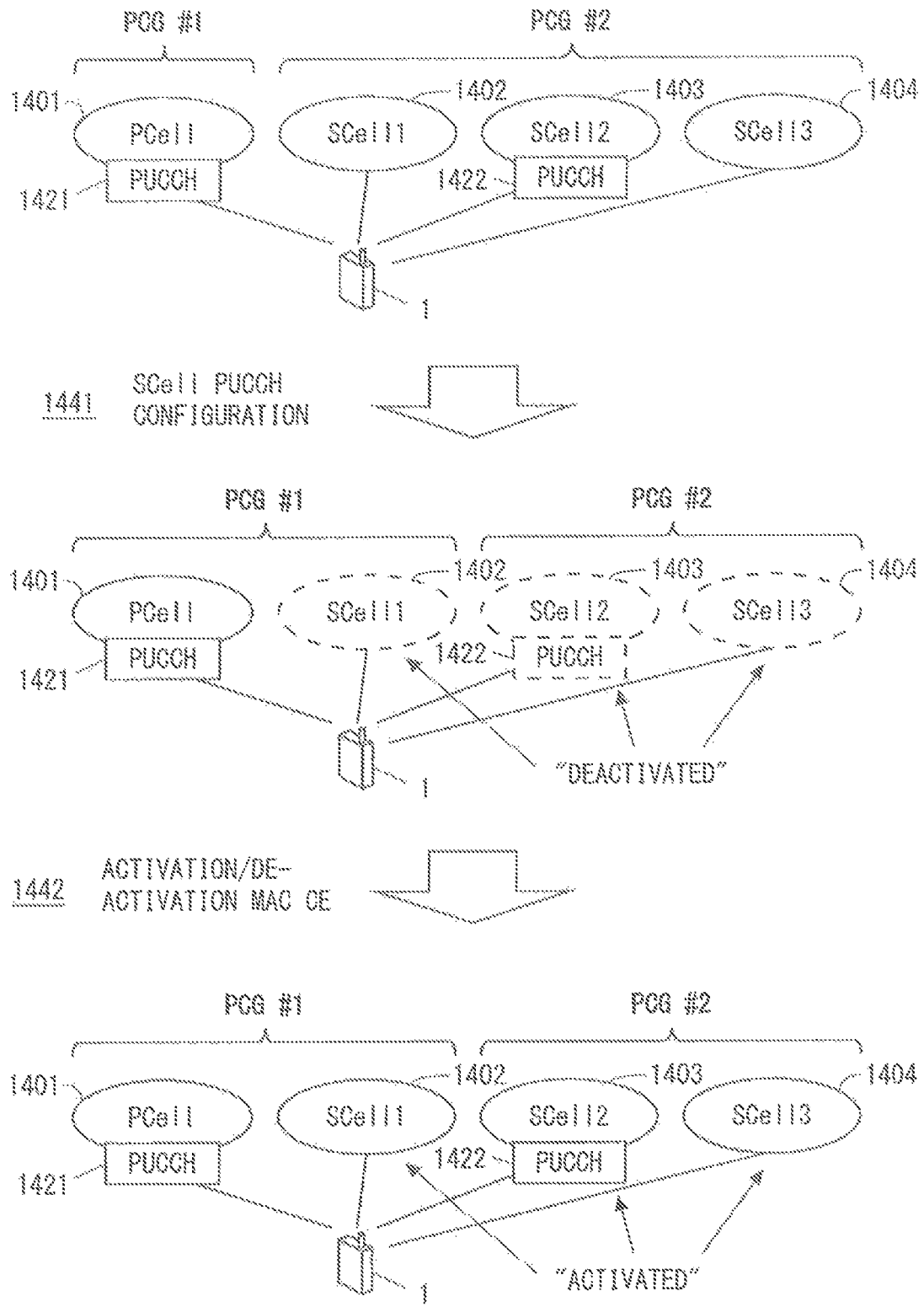
FIG. 14 is a diagram showing one example of processing for reconfiguring an S-PCG already configured in the radio terminal, which does not involve change of the PUCCH SCell.

FIG. 14 shows a first example regarding the S-PCG reconfiguration. In the example shown in FIG. 14, first, the UE 1 has been configured with PCG #1 (i.e., P-PCG) composed only of a PCell 1401 and with PCG #2 (i.e., S-PCG) composed of SCells 1402 (SCell 1), 1403 (SCell 2) and 1404 (SCell 3). The PUCCH SCell in PCG #2 is the SCell 1403 (SCell 2) and the SCells 1402, 1403, and 1404 are being activated. Accordingly, the UE 1 transmits the UCI (e.g., CSI) for the PCell 1401 on a PUCCH 1421 of the PCell 1401 and transmits the UCI (e.g., CSI) for the SCells 1402, 1403, and 1404 on a PUCCH 1422 of the SCell 1403 (SCell 2).

Next, the UE 1 receives an RRC message 1441 (e.g., RRC Connection Reconfiguration message) including an SCell PUCCH configuration. This SCell PUCCH configuration indicates that the PUCCH Cell Group (PCG) to which the SCell 1402 (SCell) belongs is changed from PCG #2 to PCG #1. In other words, this SCell PUCCH configuration indicates that the UCI (e.g., CSI) for the SCell 1402 (SCell 1) is to be transmitted on the PUCCH 1421 of the PCell 1401.

Upon receiving the RRC message 1441, the UE 1 reconfigures PCG #1 and PCG #2 in such a way that the UCI (e.g., CSI) for the SCell 1402 (SCell 1) is transmitted on the PUCCH 1421 of the PCell 1401. In some implementations, as shown in FIG. 14, the UE 1 may deactivate the SCell 1402 (SCell 1) whose PCG is changed and may further deactivate the SCells 1403 and 1404 in PCG #2 from which the SCell 1402 (SCell 1) is removed. Alternatively, in some implementations, the UE 1 may deactivate only the SCell 1402 (SCell 1) whose PCG is changed and may not change the activation status of the SCells 1403 and 1404 in PCG #2 from which the SCell 1402 (SCell 1) is removed. That is, the UE 1 may keep the SCells 1403 and 1404 in the activated state. Alternatively, in some implementations, the UE 1 may keep the SCell 1402 (SCell 1) whose PCG is changed in the activated state and deactivate the SCells 1403 and 1404 in PCG #2 from which the SCell 1402 (SCell 1) is removed. Further alternatively, in some implementations, the UE 1 may manage an SCell (s) whose PCG is changed from PCG #2 including only SCells (i.e. S-PCG) to PCG #1 including the PCell (i.e. P-PCG) to keep it in the activated state.

Next, the UE 1 receives an Activation/Deactivation MAC CE 1442 from the eNB 2. The Activation/Deactivation MAC CE 1442 instructs the UE 1 to activate the deactivated SCell(s) that has been deactivated due to the reception of the RRC message 1441. In the example shown in FIG. 14, the Activation/Deactivation MAC CE 1442 instructs activation of the SCells 1402 (SCell 1), 1403 (SCell 2), and 1404 (SCell 3). In response to the reception of the Activation/Deactivation MAC CE 1442, the UE 1 activates the SCells 1402 (SCell 1), 1403 (SCell 2), and 1404 (SCell 3). The operations of the UE 1 regarding the activated SCells and specific examples of the requirements imposed on the UE 1 to start (or re-start) CSI reporting are similar to those described above with reference to FIG. 3.

Figure 15A:
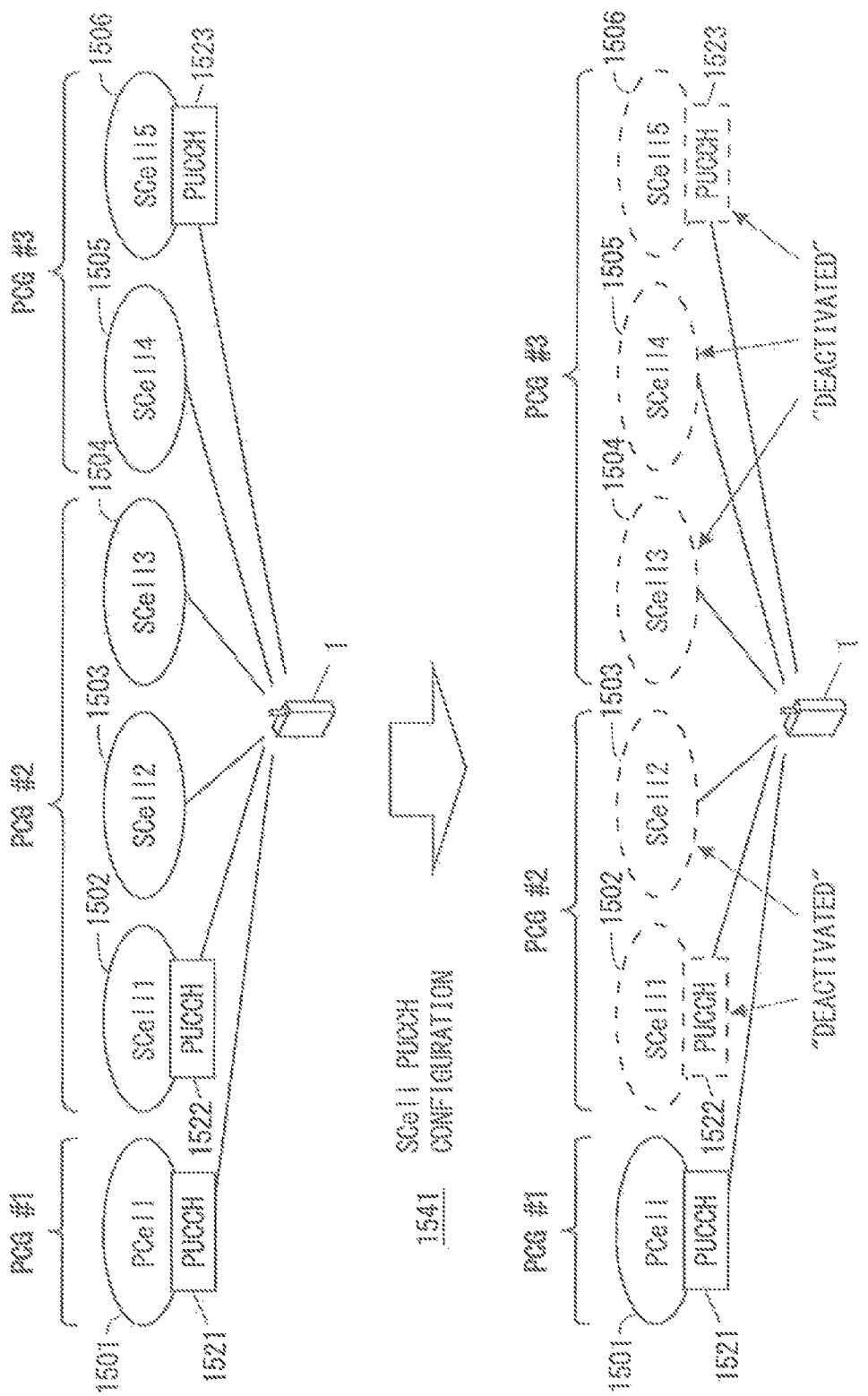
FIG. 15A is a diagram showing one example of processing for reconfiguring an S-PCG already configured in the radio terminal, which does not involve change of the PUCCH SCell.
Figure 15B:
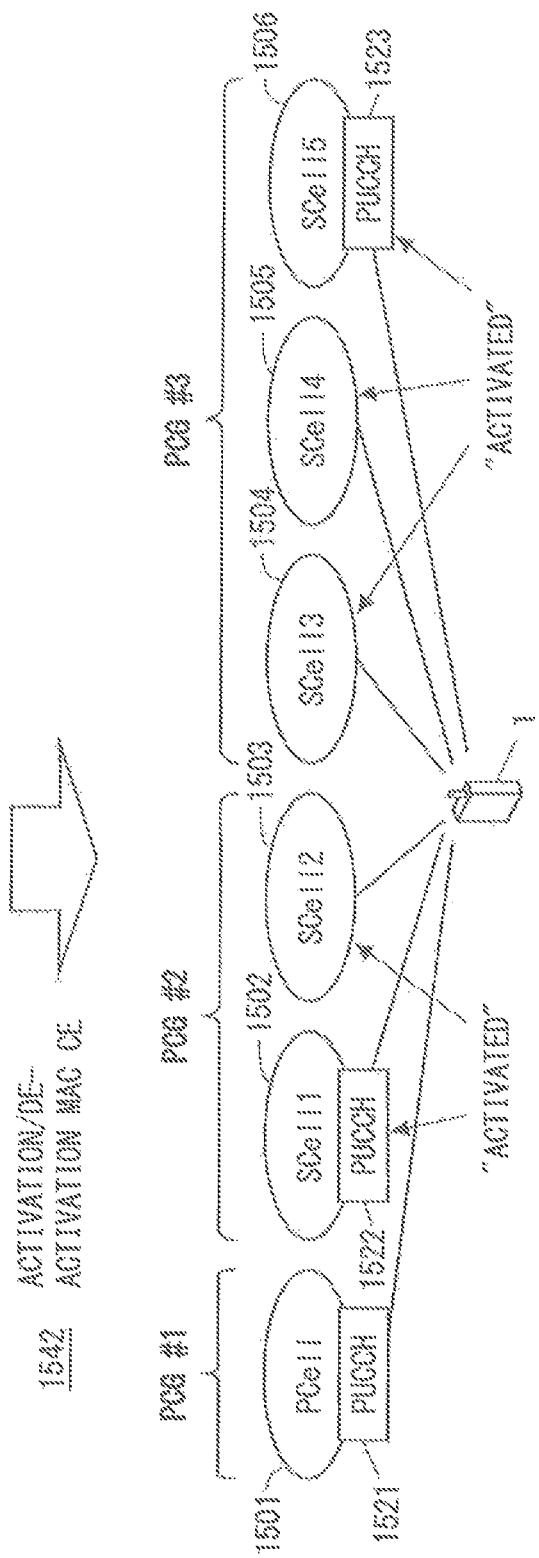
FIG. 15B is a diagram showing one example of processing for reconfiguring an S-PCG already configured in the radio terminal, which does not involve change of the PUCCH SCell.

FIGS. 15A and 15B show a second example regarding the S-PCG reconfiguration. In the example shown in FIG. 15, first, the UE 1 has been configured with PCG #1 (i.e., P-PCG) composed only of a PCell 1501, PCG #2 (i.e., S-PCG) composed of SCells 1502 (SCell 1), 1503 (SCell 2) and 1504 (SCell 3), and PCG #3 (i.e., S-PCG) composed of SCells 1505 (SCell 4) and 1506 (SCell 5). The PUCCH SCell in PCG #2 is the SCell 1502 (SCell 1) and the PUCCH SCell in PCG #3 is the SCell 1506 (SCell 5). All the SCells 1502-1506 are being activated. Thus, the UE 1 transmits the UCI (e.g., CSI) for the PCell 1501 on a PUCCH 1521 of the PCell 1501, transmits the UCI (e.g., CSI) for the SCells 1502, 1503 and 1504 on a PUCCH 1522 of the SCell 1502 (SCell 1), and transmits the UCI (e.g., CSI) for the SCells 1505 and 1506 on a PUCCH 1523 of the SCell 1506 (SCell 5).

Next, the UE 1 receives an RRC message 1541 (e.g., RRC Connection Reconfiguration message) including an SCell PUCCH configuration. This SCell PUCCH configuration indicates that the PCG to which the SCell 1504 (SCell 3) belongs is changed from PCG #2 to PCG #3. In other words, this SCell PUCCH configuration indicates that the UCI (e.g., CSI) for the SCell 1504 (SCell 3) is to be transmitted on the PUCCH 1523 of the SCell 1506 (SCell 5).

Upon receiving the RRC message 1541, the UE 1 reconfigures PCG #2 and PCG #3 in such a way that the UCI (e.g., CSI) for the SCell 1504 (SCell 3) is transmitted on the PUCCH 1523 of the SCell 1506 (SCell 5). In some implementations, as shown in FIG. 15A, the UE 1 may deactivate the SCell 1504 (SCell 3) whose PCG is changed, deactivate the SCells 1502 and 1503 in PCG #2 from which the SCell 1504 (SCell 3) is removed, and further deactivate the SCells 1505 and 1506 in PCG #3 to which the SCell 1504 (SCell 3) is added.

Alternatively, in some implementations, the UE 1 may deactivate only the SCell 1504 (SCell 3) whose PCG is changed and may not change the activation status of the other SCells 1502, 1503, 1505, and 1506. That is, the UE 1 may keep the SCells 1502, 1503, 1505, and 1506 in the activated state. Alternatively, in some implementations, the UE 1 may deactivate the SCell 1504 (SCell 3) whose PCG is changed and also deactivate the SCells 1505 and 1506 in PCG #3 to which the SCell 1504 (SCell 3) is added. That is, the UE 1 may not change the activation status of the SCells 1502 and 1503 in PCG #2 from which the SCell 1504 (SCell 3) is removed.

Next, the UE 1 receives an Activation/Deactivation MAC CE 1542 from the eNB 2. The Activation/Deactivation MAC CE 1542 instructs the UE 1 to activate the deactivated SCell(s) that has been deactivated due to the reception of the RRC message 1541. In the example shown in FIG. 15B, the Activation/Deactivation MAC CE 1542 instructs activation of the SCells 1502 to 1506. In response to the reception of the Activation/Deactivation MAC CE 1542, the UE 1 activates the SCells 1502 to 1506. The operations of the UE 1 regarding the activated SCells and specific examples of the requirements imposed on the UE 1 to start (or re-start) CSI reporting are similar to those described above with reference to FIG. 3.

Second Embodiment

This embodiment provides a specific example of an information element to be transmitted from the eNB 2 to the UE 1 in order to configure a PUCCH in an SCell that has already been added or is to be newly added. This information element corresponds to, for example, the information element included in the RRC CONNECTION RECONFIGURATION message transmitted in Block 203 in FIG. 2 and further corresponds to the SCell PUCCH configuration shown in FIGS. 3, 4 and 6-12.

In some implementations, this information element may indicate a PUCCH Cell Group (PCG). In this case, this information element may be defined to give a PUCCH Cell Group index to each cell. Alternatively, this information element may be defined to generate a list of cells included in each PUCCH Cell Group.

FIG. 16 shows one example of the information element that gives the PUCCH Cell Group index to each cell. Specifically, FIG. 16 shows an improvement of the sCell-ToAddModList information element (IE) in the RRC Connection Reconfiguration message. The "PUCCH Cell Group configuration" (1601) shown in FIG. 16 is defined to give the PUCCH Cell Group index to each cell. The "SCellIndex" (1602) is an identifier to be used to identify the SCell to be added or modified. The "PUCCH Cell Group configuration" (1601) gives a "PUCCH Cell Group index (i.e., pucch-CellGroupIndex-r13)" to the SCell identified by the "SCellIndex" (1602). The "PUCCH Cell Group index" is an identifier used to identify the PUCCH Cell Group. The maximum value 31 of the "PUCCH Cell Group index" is an example of the number determined based on 32, which is being discussed as the maximum number of CCs supported by CA, and may be another value.

In one example, as shown by Alt. 1 in FIG. 16, the PCG Index of P-PCG including the PCell may be set to 0 by default. In this case, the "PUCCH Cell Group configuration" (1601) may give the PCG Index to only the SCell which belongs to S-PCG including only the one or more SCells and may not explicitly give the PCG Index to the SCell that belongs to P-PCG. In another example, as shown in Alt. 2 in FIG. 16, the "PUCCH Cell Group configuration" (1601) may explicitly give the PCG Index to all the SCells.

In the case in which the PUCCH Cell Group Index is given to each of the cells (e.g., FIG. 16), when the PCG Index has been configured in one SCell or when the PCG Index that has already been configured has been changed, the UE 1 may deactivate this SCell and another SCell(s) affected by this event.

Specifically, if the SCellIndex (1602) contained in the sCellToAddModList is not included in the current UE configuration and the sCellToAddModList includes the PUCCH Cell Group index (1601), the UE 1 may add a PUCCH Cell Group configuration in accordance with the received PUCCH Cell Group Index (1601). Further, if the SCellIndex (1602) contained in the sCellToAddModList is included in the current UE configuration and the sCellToAddModList includes the PUCCH Cell Group Index (1601), the UE 1 may: (a) modify the PUCCH Cell Group configuration in accordance with the received PUCCH Cell Group index; (b) if the SCell is currently in the activated state, configure, by the RRC layer, the lower layer(s) to change (or move) the SCell to the deactivated state; and (c) if the SCell is currently in the deactivated state, configure, by the RRC layer, the lower layer(s) to consider the SCell to be in the deactivated state. If the MAC layer of the UE 1 is configured to change the state of the SCell to the deactivated state by the RRC layer, the MAC layer of the UE 1 deactivates the SCell, stops the sCellDeactivationTimer associated with the SCell, and flushes all the HARQ buffers associated with the SCell. Further, the MAC layer of the UE 1 stops transmission of the UCI (e.g. CSI) for this SCell.

On the other hand, FIG. 17 shows one example of the information element for generating the list of cells included in each PUCCH Cell Group. Specifically, FIG. 17 shows the "pucch-CellGroup" IE (1701) and "CellGroupList" IE (1704) that are newly defined in the RRC Connection Reconfiguration message. The "pucch-CellGroup" IE (1701) includes a "pnceh-CellGroupIndex" (1702) and a "cellGroupList" (1703). The "pucch-CellGroupIndex" (1702) is an identifier used to identify the PUCCH Cell Group (PCG). The "cellGroupList" (1703) includes, as shown in the "CellGroupList" IE (1704), an identifier(s) (sCellIndex) of the one or more SCells included in the PCG identified by the "pucch-CellGroupIndex" (1702).

In one example, as shown in Alt. 1 in the "pucch-CellGroupIndex" (1702) in FIG. 17, the PCG Index of the P-PCG including the PCell may be set to 0 by default. In this case, the PCG index may be given to only S-PCGs each including only one or more SCells and the list of SCell(s) included in each S-PCG may be generated. The PCG Index may not be explicitly given to the SCells that belongs to the P-PCG.

In another example, as shown in Alt. 2 in the "pucch-CellGroup Index" (1702) in FIG. 17, for each of all the PCGs including the P-PCG, a list of SCell(s) included therein may be explicitly generated. In this case, as shown in FIG. 17, the PCell may be removed from the list. Alternatively, the PCell may be explicitly described in the list.

Further, in one example, as shown by Alt. 1 in the "CellGroupList" IE (1704) in FIG. 17, the PUCCH Cell Index may not be explicitly given when the PUCCH Cell is a PCell, and the PUCCH Cell Index may be given only when the PUCCH Cell is an SCell. In this case, an SCellIndex may be used as the PUCCH Cell Index. When the PUCCH Cell Index has not been given, this means that the UCI (e.g., CSI) of this SCell is transmitted on the PUCCH of the PCell.

In another example, as shown by Alt. 2 in the "CellGroupList" IE (1704) in FIG. 17, the PUCCH Cell Index may be explicitly given to all the SCells. In this case, a ServCellIndex may be used as the PUCCH Cell Index.

In the case in which the list of cells included in each PUCCH Cell Group is generated (e.g., FIG. 17), when a PCG is newly configured or the list of cells included in the PCG has been changed, the UE 1 may deactivates all the SCells in the PCG. Alternatively, if the PCG is the S-PCG including only SCells, the UE 1 may deactivates all the SCells in the S-PCG, and if the PCG is the P-PCG including the PCell, the UE 1 may keep the activated SCell(s) in the activated state.

When the example shown in FIG. 17 is used, the UE 1 may operate as follows. If the "pucch-CellGroupIndex" (1702) contained in the "pucch-CellGroup" IE (1701) is not included in the current UE configuration, the UE 1 may add the PUCCH Cell Group in accordance with the received "pucch-CellGroup" IE (1701). Otherwise (i.e., if the "pucch-CellGroupIndex" (1702) contained in the "pucch-CellGroup" IE (1701) is included in the current UE configuration), the UE 1 may modify the PUCCH Cell Group in accordance with the received "pucch-CellGroup" IE (1701). Further, if each of the SCells included in or to be configured in the PUCCH Cell Group is currently in the activated state, the UE 1 may configure, by the RRC layer, the lower layer(s) to change (or move) the SCell to the deactivated state, and if the SCell is currently in the deactivated state, the UE 1 may configure, by the RRC layer, the lower layer(s) to consider the SCell to be in the deactivated state.

Third Embodiment

This embodiment provides a specific example of an information element to be transmitted from the eNB 2 to the UE 1 in order to configure a PUCCH in an SCell that has already been added or is to be newly added. This information element corresponds to, for example, the information element included in the RRC CONNECTION RECONFIGURATION message transmitted in Block 203 in FIG. 2 and farther corresponds to the SCell PUCCH configuration shown in FIGS. 3, 4 and 6-12.

In some implementations, this information element may indicate a cell on which a PUCCH carrying the UCI for each cell is transmitted (hereinafter referred to as a "PUCCH Cell"). In this case, as shown in FIG. 18, this information element may be defined to give the PUCCH Cell index to each cell.

Figure 18:
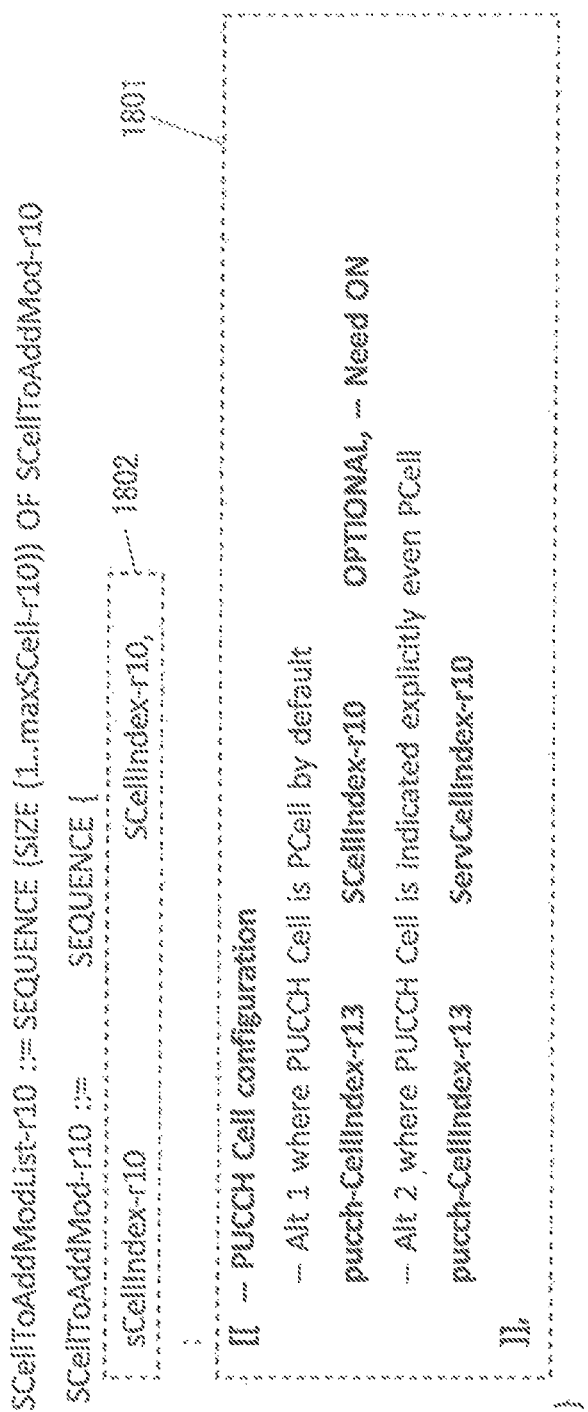
FIG. 18 is a diagram showing one example of an information element for configuring a PUCCH in an SCell.

FIG. 18 shows one example of the information element that gives the PUCCH Cell index to each cell. Specifically, FIG. 18 shows an improvement of the sCellToAddModList information element in the RRC Connection Reconfiguration message. The "PUCCH Cell configuration" (1801) shown in FIG. 18 is defined to give the "PUCCH Cell index (i.e., pucch-CellIndex-r13)" to each cell. The "PUCCH Cell index" is an identifier to be used to identify the PUCCH Cell configured to transmit the UCI for each cell.

In one example, as shown by Alt. 1 in FIG. 18, the PUCCH Cell index may not be explicitly given when the PUCCH Cell is the PCell, and it may be given only when the PUCCH Cell is an SCell. In this case, an SCellIndex may be used as the PUCCH Cell Index. When the PUCCH Cell index has not been given, it means that the UCI (e.g., CSI) for this SCell is transmitted on the PUCCH of the PCell.

In another example, as shown by Alt. 2 in FIG. 18, the PUCCH Cell Index may be explicitly given to all the SCells. In this case, a ServCellIndex may be used as the PUCCH Cell Index.

In the case in which the PUCCH Cell index is given to each cell (e.g., FIG. 18), when the PUCCH Cell Index is newly configured for an SCell or when the PUCCH Cell Index that has already been configured for the SCell is changed, the UE 1 may deactivate this SCell and also deactivates another SCell(s) affected by this event.

Specifically, if the SCellIndex (1802) contained in the sCellToAddModList is not included in the current UE configuration and the sCellToAddModList includes the PUCCH Cell Index (1801), the UE 1 may configure, by the RRC layer, the lower layer(s) to use the PUCCH on the SCell indicated by the received PUCCH Cell Index. Further, if the SCellIndex (1802) contained in the sCellToAddModList is included in the current UE configuration and the sCellToAddModList includes the PUCCH Cell Index (1801), the UE 1 may: (a) configure, by the RRC layer, the lower layer(s) to use the PUCCH on the SCell indicated by the received PUCCH Cell Index; (b) if the SCell is currently in the activated state, configure, by the RRC layer, the lower layer(s) to change (or move) the SCell to the deactivated state; and (e) if the SCell is currently in the deactivated state, configure, by the RRC layer, the lower layer(s) to consider the SCell to be in the deactivated state.

Figure 19:
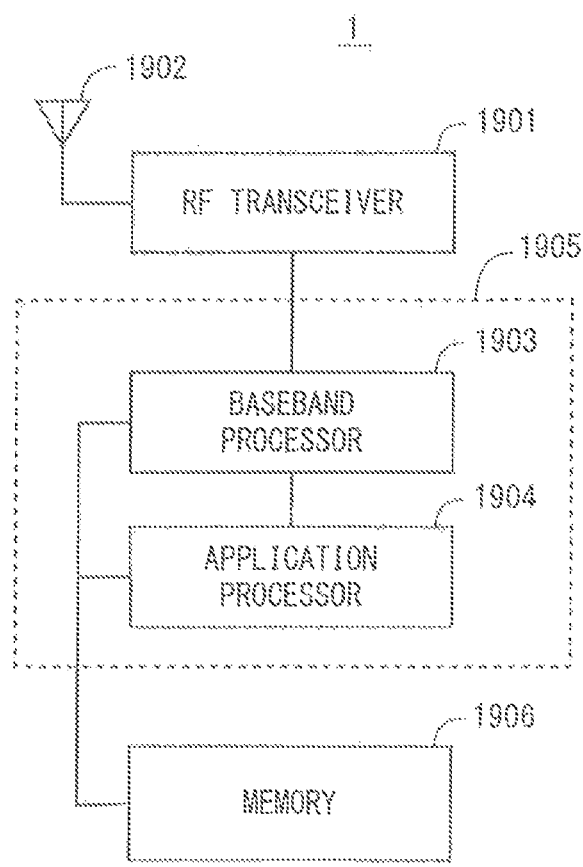
FIG. 19 is a block diagram showing a configuration example of a radio terminal according to the several embodiments.

Lastly, configuration examples of the UE 1 and the eNB 2 according to the aforementioned embodiments will be described. FIG. 19 is a block diagram showing a configuration example of the UE 1. A Radio Frequency (RP) transceiver 1901 performs analog RE signal processing to communicate with the eNB 2. The analog RF signal processing performed by the RP transceiver 1901 includes frequency up-conversion, frequency down-conversion, and amplification. The RF transceiver 901 is coupled to an antenna 1902 and a baseband processor 1903. That is, the RF transceiver 1901 receives modulated symbol data (or OFDM symbol data) from the baseband processor 1903, generates a transmission RF signal, and supplies the transmission RF signal to the antenna 1902. Further, the RF transceiver 1901 generates a baseband reception signal based on a reception RF signal received by the antenna 1902 and supplies this signal to the baseband processor 1903.

The baseband processor 1903 perform s digital baseband signal processing (i.e., data plane processing) and control plane processing for radio communication. The digital baseband signal processing includes (a) data compression/decompression, (b) data segmentation/concatenation, (e) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT) and the like. On the other hand, the control plane processing includes communication management of a layer 1 e.g., transmission power control), a layer 2 (e.g., radio resource management and hybrid automatic repeat request (HARQ) processing), and a layer 3 (e.g., signalling regarding attach, mobility, and call management).

For example, in the case of LTE and LTE-Advanced, the digital baseband signal processing performed by the baseband processor 1903 may include signal processing of a Packet Data Convergence Protocol (PDCP) layer, a Radio Link Control (RLC) layer, a MAC layer, and a PHY layer. Further, the control plane processing performed by the baseband processor 1903 may include processing of a Non-Access Stratum (NAS) protocol, an RRC protocol, and MAC CEs.

The baseband processor 1903 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be integrated with an application processor 1904 described in the following.

The application processor 1904 is also referred to as a CPU, an MPU, a microprocessor, or a processor core. The application processor 1904 may include a plurality of processors (processor cores). The application processor 1904 loads a system software program (Operating System (OS)) and various application programs (e.g., phone call application, WEB browser, mailer, camera operation application, and music player application) from a memory 1906 or another memory (not shown) and executes these programs, thereby providing various functions of the UE 1.

In some implementations, as represented by a dashed line (1905) in FIG. 19, the baseband processor 1903 and the application processor 1904 may be integrated on a single chip. In other words, the baseband processor 1903 and the application processor 1904 may be implemented in a single System on Chip (SoC) device 1905. The SoC device may be referred to as a system Large Scale Integration (LSI) or a chip set.

The memory 1906 is a volatile memory, a non-volatile memory, or a combination thereof. The memory 1906 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1906 may include, for example, an external memory device that can be accessed by the baseband processor 1903, the application processor 1904, and the SoC 1905. The memory 1906 may include a built-in memory device that is integrated in the baseband processor 1903, the application processor 1904, or the SoC 1905. The memory 1906 may include a memory in a Universal Integrated Circuit Card (UICC).

The memory 1906 may store a software module(s) (a computer program(s)) including instructions and data for performing the processing of the UE 1 described in the aforementioned embodiments. In some implementations, the baseband processor 1903 or the application processor 1904 may be configured to load this software module(s) from the memory 1906 and executes the loaded software module(s), thereby performing the process of the UE 1 described in the aforementioned embodiments.

Figure 20:
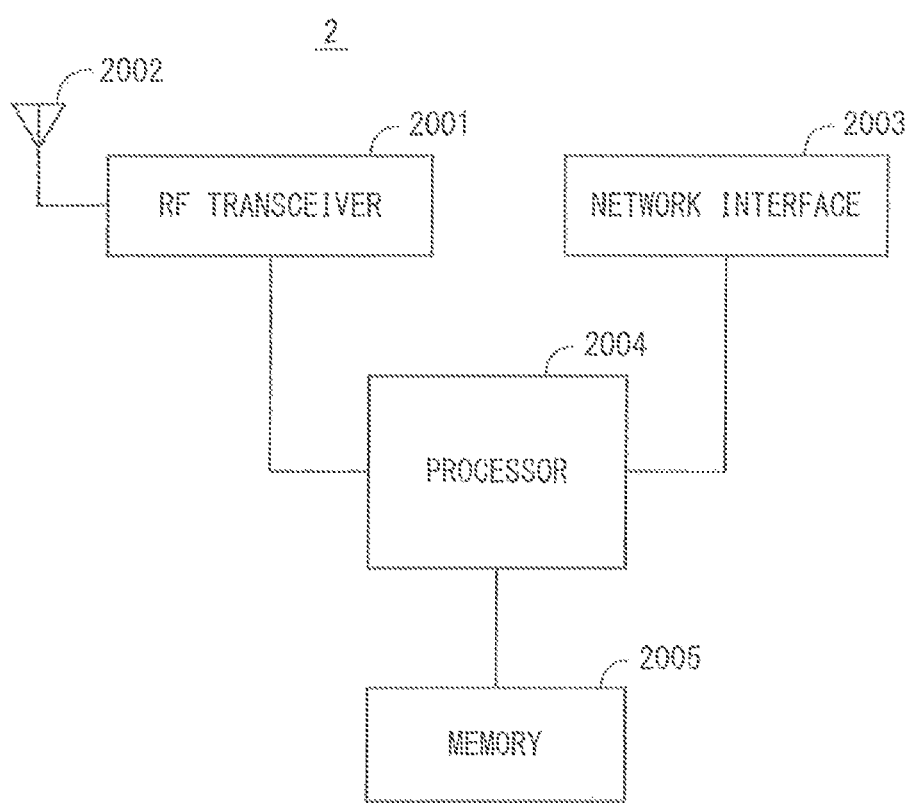
FIG. 20 is a block diagram showing a configuration example of a radio base station according to the several embodiments.

FIG. 20 is a block diagram showing a configuration example of the eNB 2 according to the aforementioned embodiments. Referring to FIG. 20, the eNB 2 includes an RF transceiver 2001, a network interface 2003, a processor 2004, and a memory 2005. The RF transceiver 2001 performs analog RF signal processing to communicate with the UE 1. The RF transceiver 2001 may include a plurality of transceivers. The RF transceiver 2001 is coupled to the antenna 2002 and the processor 2004. The RF transceiver 2001 receives modulated symbol data (or OFDM symbol data) from the processor 2004, generates a transmission RF signal, and supplies the transmission RF signal to the antenna 2002. Further, the RF transceiver 2001 generates a baseband reception signal based on a reception RF signal received by the antenna 2002 and supplies the baseband reception signal to the processor 2004.

The network interface 2003 is used to communicate with a network node (e.g., MME and S/P-GW). The network interface 2003 may include, for example, a network interface card (NIC) conforming to the IEEE 802.3 series.

The processor 2004 performs digital baseband signal processing (i.e., data plane processing) and control plane processing for radio communication. For example, in the case of LTE and LTE-Advanced, the digital baseband signal processing performed by the processor 2004 may include signal processing of the PDCP layer, the REC layer, the MAC layer, and the PHY layer. Further, the control plane processing performed by the processor 2004 may include processing of the S1 protocol, the RRC protocol, and the MAC CEs.

The processor 2004 may include a plurality of processors. The processor 2004 may include, for example, a modem processor (e.g., DSP) that performs digital baseband signal processing and a protocol stack processor (e.g., CPU or MPU) that performs control plane processing.

The memory 2005 is composed of a combination of a volatile memory and a non-volatile memory. The volatile memory is, for example, an SRAM, a DRAM, or a combination thereof. The non-volatile memory is, for example, an MROM, a PROM, a flash memory, a hard disc drive, or any combination thereof. The memory 2005 may include a storage that is disposed separately from the processor 2004. In this case, the processor 2004 may access the memory 2005 via the network interface 2003 or an I/O interface (not shown).

The memory 2005 may store a software module(s) (a computer program(s)) including instructions and data for performing processing by the eNB 2 described in the aforementioned embodiments. In some implementations, the processor 2004 may be configured to load this software module(s) from the memory 2005 and execute the loaded software module(s), thereby performing the processing of the eNB 2 described in the aforementioned embodiments.

As described with reference to FIGS. 19 and 20, each of the processors included in the UE and the eNB 2 according to the aforementioned embodiments executes one or more programs including instructions for causing a computer to execute the algorithms described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (FROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The aforementioned embodiments may be implemented individually or in any combination.

The aforementioned embodiments may be applied to radio communication systems supporting Dual Connectivity (DC). That is, the apparatuses, the methods, and the programs for configuring a PUCCH in the SCell described in the aforementioned embodiments may be applied to carrier aggregation within the Master Cell Group (MCG) in Dual Connectivity or may be applied to carrier aggregation within a Secondary Cell Group (SCG) in Dual Connectivity. In the case of carrier aggregation in the Secondary Cell Group (SCG), the PCell described in the aforementioned embodiments corresponds to the Primary SCell (PSCell). The PSCell is a special SCell in the SCO provided by the Secondary eNB (SeNB). The PSCell can be configured with a PUCCH and is never deactivated. For initial configuration of the PSCell, a RACH procedure is required.

One or more SCells used in CA described in the aforementioned embodiments may include a phantom Cell. The Phantom Cell is a small cell that is expected to be used in the C/U-plane spilt scenario. The Phantom Cell uses, for example, a new carrier type (NCT) that does not require transmission of an existing cell-specific signal/channel such as a Primary Synchronization Signal (PSS), a Secondary Synchronization Signal (SSS), a Cell-specific Reference Signal (CRS), a Master information Block (MIB), and a System information Block (SIB).

In the aforementioned embodiments, LTE/LTE-Advanced and the improvement thereof have been mainly described. However, the aforementioned embodiments may be applied to other radio communication systems such as a dual cell operation in UMTS (i.e., Dual Cell HSPA, e.g., DC-HSDPA, DC-HSDPA). The eNB 2 described in the aforementioned embodiments can also be referred to as a radio station. The radio station herein may include a control node having a radio resource management function (e.g., Radio Network Controller (RNC) in UMTS or Base Station Controller (BSC) in the GSM system) and a radio transmission node (e.g., NodeB in UMTS or Base transceiver station (BTS) in the GSM system). The radio station herein may include, as shown in FIG. 1, an RRH/RRE(s).

Further, the aforementioned embodiments are merely examples of application of the technical ideas obtained by the inventor. These technical ideas are not limited only to the aforementioned embodiments and various modifications can be made thereto.

This application is based upon and claims the benefit of priority from Japanese Patent Application No. 2015-079068, filed on Apr. 8, 2015, the disclosure of which is incorporated herein in its entirety by reference.

REFERENCE SIGNS LIST

1 RADIO TERMINAL
2 RADIO BASE STATION
1901 RADIO FREQUENCY (RE) TRANSCEIVER
1903 BASEBAND PROCESSOR
2001 RE TRANSCEIVER
2004 PROCESSOR

The invention claimed is:

1. A radio terminal comprising:
    a wireless transceiver configured to communicate with a radio station; and
    at least one processor configured to perform carrier aggregation with the radio station using the wireless transceiver, wherein
    the at least one processor is configured in such a way that, when the at least one processor receives a downlink signalling message including an information element indicating that a first uplink control channel is to be configured in a first secondary cell (SCell) in the carrier aggregation, wherein the first uplink control channel is to be used to transmit, from the radio terminal to the radio station, uplink control information (UCI) for at least one SCell including the first SCell, the at least one processor deactivates one or more activated SCells in an activated state among the at least one SCell, and
    the at least one processor is configured, when the UCI for any one of the at least one SCell has been transmitted by the radio terminal on a primary cell (PCell) or on a second SCell different from the at least one SCell before receiving the downlink signalling message, to deactivate one or more third SCells that are different from the at least one SCell and whose UCI is transmitted on the PCell or on the second SCell.

2. The radio terminal according to claim 1, wherein
    the downlink signalling message is a Radio Resource Control (RRC) message,
    the at least one processor is configured to provide an RRC layer that processes the downlink signalling message and also provide a lower layer lower than the RRC layer, and
    the at least one processor is configured, when the at least one processor receives the downlink signalling message, to set the lower layer to consider the one or more activated SCells to be in a deactivated state or to change the one or more activated SCells to the deactivated state.

3. The radio terminal according to claim 1, wherein the downlink signalling message does not involve release of the one or more activated SCells.

4. The radio terminal according to claim 1, wherein the downlink signalling message requests the radio terminal to perform:

newly configuring the first uplink control channel in the first SCell and configuring the radio terminal to transmit the UCI for the first SCell on the first SCell, not on the PCell;

newly configuring the first uplink control channel in the first SCell, configuring the radio terminal to transmit the UCI for the first SCell on the first SCell, and changing a configuration in such a way that the UCI for one or more SCells other than the first SCell among the at least one SCell is transmitted on the first uplink control channel, not on a second uplink control channel transmitted on the PCell or another SCell; or changing a specific SCell, on which the first uplink control channel is transmitted, from any SCell other than the first SCell included in the at least one SCell to the first SCell.

5. The radio terminal according to claim 4, wherein the other SCell is included in the one or more SCells other than the first SCell among the at least one SCell.

6. The radio terminal according to claim 1, wherein the downlink signalling message requests the radio terminal to perform:

adding a new secondary-cell group consisting of the at least one SCell including the first SCell as a specific SCell on which the first uplink control channel is transmitted;

reconfiguring an existing first secondary-cell group consisting of the at least one SCell to change the specific SCell from another SCell in the first secondary-cell group to the first SCell; or adding the first SCell to an existing second secondary-cell group and modifying the second secondary-cell group to change the specific SCell from another SCell in the secondary-cell group to the first SCell.

7. The radio terminal according to claim 6, wherein the at least one processor is configured, upon receiving the downlink signalling message, to deactivate all the SCells in the activated state included in: the new secondary-cell group; the first secondary-cell group; or the modified second secondary-cell group.

8. The radio terminal according to claim 1, wherein the at least one processor is configured to configure the first uplink control channel in the first SCell upon receiving the downlink signalling message.

9. The radio terminal according to claim 1, wherein the at least one processor is configured, upon receiving the downlink signalling message, to stop transmission of the UCI for each of the one or more activated SCells in the PCell or in any SCell within a predetermined period of time based on the reception of the downlink signalling message.

10. The radio terminal according to claim 1, wherein the first SCell is in an activated state or in a deactivated state before the reception of the downlink signalling message.

11. The radio terminal according to claim 1, wherein the UCI comprises at least Channel State Information (CSI).

12. A method performed in a radio terminal configured to communicate with a radio station, the method comprising:

receiving from the radio station one or more first downlink signalling messages including secondary cell (SCell) configuration for carrier aggregation and adding one or more SCells in the carrier aggregation, the one or more SCells being initially in a deactivated state;

receiving from the radio station one or more second downlink signalling messages including an activation instruction and activating part or all of the one or more SCells in accordance with the activation instruction;

deactivating, upon receiving a third downlink signalling message including an information element indicating that a first uplink control channel is to be configured in a first SCell that has already been added in accordance with the SCell configuration or is to be newly added, where the first uplink control channel is to be used to transmit, from the radio terminal to the radio station, uplink control information (UCI) for at least one SCell including the first SCell, one or more activated SCells in an activated state among the at least one SCell; and deactivating, when the UCI for any one of the at least one SCell has been transmitted by the radio terminal on a primary cell (PCell) or on a second SCell different from the at least one SCell before receiving the third downlink signalling message, one or more third SCells that are different from the at least one SCell and whose UCI is transmitted on the PCell or on the second SCell.

13. The method according to claim 12, wherein the third downlink signalling message is a Radio Resource Control (RRC) message, and the deactivating comprises, upon receiving the third downlink signalling message, setting, by an RRC layer, a lower layer lower than the RRC layer to consider the one or more activated SCells to be in a deactivated state or to change the one or more activated SCells to the deactivated state.

14. The method according to claim 12, wherein the third downlink signalling message does not involve release of the one or more activated SCells.

15. A radio station comprising:

a wireless transceiver configured to communicate with a radio terminal; and at least one processor configured to perform carrier aggregation with the radio terminal using the wireless transceiver, wherein the at least one processor is configured to transmit to the radio terminal a first downlink signalling message including an information element indicating that a first uplink control channel is to be configured in a first secondary cell (SCell) in the carrier aggregation, wherein:

the first uplink control channel is to be used to transmit, from the radio terminal to the radio station, uplink control information (UCI) for at least one SCell including the first SCell, the information element causes the radio terminal to deactivate one or more activated SCells in an activated state among the at least one SCell to be deactivated by the radio terminal, and the information element further causes the radio terminal, when the UCI for any one of the at least one SCell has been transmitted by the radio terminal on a primary cell (PCell) or on a second SCell different from the at least one SCell before receiving the first downlink signalling message, to deactivate one or more third SCells that are different from the at least one SCell and whose UCI is transmitted on the PCell or on the second SCell.

16. The radio station according to claim 15, wherein the first downlink signalling message is a Radio Resource Control (RRC) message, and the at least one processor is configured to provide an RRC layer that processes the first downlink signalling message and also provide a lower layer lower than the RRC layer, and the at least one processor is configured, when the at least one processor completes the transmission of the first downlink signalling message, to set the lower layer to consider the one or more activated SCells to be deactivated by the radio terminal.

17. The radio station according to claim 15, wherein the first downlink signalling message does not involve release of the one or more activated SCells.

18. The radio station according to claim 15, wherein the at least one processor is further configured, after transmitting the first downlink signalling message, to transmit to the radio terminal one or more second downlink signalling messages including an activation instruction for activating one or more SCells among the at least one SCell.

* * * * *